United States Patent
Gupta et al.

(10) Patent No.: US 6,438,562 B1
(45) Date of Patent: Aug. 20, 2002

(54) PARALLEL INDEX MAINTENANCE

(75) Inventors: Shivani Gupta, Mountain View; William H. Waddington, Foster City; Benoit Dageville, Redwood Shores, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/379,625

(22) Filed: Aug. 24, 1999

(51) Int. Cl.$^7$ .............................. G06F 17/30
(52) U.S. Cl. ...................... 707/201; 707/202
(58) Field of Search .............. 707/1–4, 7, 8, 707/10, 5, 201, 200, 204

(56) References Cited

U.S. PATENT DOCUMENTS

| | | | | |
|---|---|---|---|---|
| 5,204,958 A | * | 4/1993 | Cheng et al. ............... 707/102 |
| 5,440,732 A | * | 8/1995 | Lomet et al. ............... 707/1 |
| 5,551,027 A | * | 8/1996 | Choy et al. ................ 707/201 |
| 5,899,988 A | * | 5/1999 | Depledge et al. ........... 707/3 |
| 5,960,194 A | * | 9/1999 | Choy et al. ................ 707/102 |
| 5,991,771 A | * | 11/1999 | Falls et al. ................ 707/202 |
| 6,014,656 A | * | 1/2000 | Hallmark et al. ........... 707/2 |
| 6,026,406 A | * | 2/2000 | Huang et al. ............... 707/100 |
| 6,092,061 A | * | 7/2000 | Choy ........................ 707/1 |
| 6,249,784 B1 | * | 6/2001 | Macke et al. .............. 707/3 |
| 6,278,992 B1 | * | 8/2001 | Curtis et al. .............. 707/3 |

* cited by examiner

Primary Examiner—John Breene
Assistant Examiner—Debbie M Le
(74) Attorney, Agent, or Firm—Brian D. Hickman; Hickman Palermo Truong & Becker LLP

(57) ABSTRACT

A method, system and product for coordinating a parallel update for a global index of an indexed table involves a coordinator process and slave processes. The coordinator process receives index maintenance records from data manipulation slaves for an indexed table. Each index maintenance record includes a value for an index key of a global index of the table. The coordinator process computes index key value ranges and sends each range to an index update slave. Each slave updates the global index using just the index maintenance records with key values in its respective range, thus avoiding contention among the slaves and increasing clustering so that scaleable parallelism may be more closely attained. Techniques are also described for deferring the maintenance of global indexes relative to the time when the table on which they are built is changed.

43 Claims, 15 Drawing Sheets

Table Emp 200

| Empname | Empno | SSN | Deptno | Salary | Title | Startday |
|---|---|---|---|---|---|---|
| Fred | 1 | 000-XX-0123 | 10 | 45,000 | Programmer | 10/1/65 |
| Wilma | 2 | 000-XX-0222 | 10 | 55,000 | Supervisor | 10/1/65 |
| Betty | 99 | 000-XX-0333 | 11 | 45,000 | Programmer | 11/1/65 |
| Barney | 100 | 000-XX-0150 | 11 | 55,000 | Counsel | 10/1/65 |
| Ralph | 101 | 240-YY-0001 | 11 | 40,000 | Programmer | 9/1/55 |
| Alice | 102 | 240-YY-1111 | 10 | 45,000 | Programmer | 11/1/56 |
| ... | ... | ... | ... | ... | ... | ... |

FIG. 2

| | 611 | 612 | 613 | 614 | |
|---|---|---|---|---|---|
| | Index ID | Key value | Data ID | Opcode | |
| | 1 (Deptno) | 10 | 1 | delete | — 621 |
| | 1 | 11 | 101 | delete | — 622 |
| | 1 | 10 | 102 | delete | — 623 |
| | 1 | 11 | 1 | insert | — 624 |
| | 1 | 12 | 101 | insert | — 625 |
| | 1 | 11 | 102 | insert | — 626 |
| | ... | ... | ... | ... | |
| | 2 (Salary) | 45,000 | 99 | delete | — 631 |
| | 1 | 12 | 99 | delete | — 632 |
| | 2 | 45,000 | 102 | delete | — 633 |
| | 1 | 11 | 102 | delete | — 634 |
| | ... | ... | ... | ... | |

630 index maintenance records 610 index maintenance fields

FIG. 6

1100 Index Update Distribution Table

| Index ID (1111) | Key start value (1112) | Key end value (1113) | Slave ID (1114) | Node ID (1115) | |
|---|---|---|---|---|---|
| 1 | 0 | 11 | 741 | 111 | — 1121 |
| 1 | 12 | 20 | 742 | 112 | — 1122 |
| 1 | 21 | 40 | 743 | 113 | — 1123 |
| 2 | 0 | 40,000 | 741 | 111 | — 1124 |
| 2 | 40,001 | 50,000 | 742 | 112 | — 1125 |
| 2 | 50,001 | 500,000 | 743 | 113 | — 1126 |
| ... | ... | ... | ... | ... | |

530 index update distribution records 1110 index update distribution fields

FIG. 11

PARALLEL INDEX MAINTENANCE

FIELD OF THE INVENTION

The present invention relates to database management systems and more particularly to updating indexes in response to parallel execution of data manipulation operations.

BACKGROUND OF THE INVENTION

To fully utilize the computing power of a multi-processing system, a larger task (a "parent task") may be divided into smaller tasks ("work granules") which are then distributed to processes ("slaves") running on one or more processing nodes. The slaves execute their assigned work granules in parallel with the other slaves, causing the parent task to complete faster than if it were executed by a single process. Each node may contain multiple processors and multiple concurrent processes. The process that divides parent tasks into work granules and distributes the work granules to processes on the various processing nodes is referred to herein as the coordinator process or "master".

MULTI-PROCESSING SYSTEMS

Multi-processing computer systems typically fall into three categories: shared everything systems, shared-disk systems, and shared-nothing systems. The constraints placed on the coordinator process during the work granule distribution process vary based on the type of multi-processing system involved. In shared-everything systems, processes on all processors have direct access to all dynamic, i.e., volatile, memory devices (hereinafter generally referred to as "memory") and to all static, i.e., persistent, memory devices (hereinafter generally referred to as "disks") in the system.

In shared-disk systems, processors and memories are grouped into nodes. Each node in a shared-disk system may itself constitute a shared-everything system that includes multiple processors and multiple memories. Processes on all processors can access all disks in the system, but only the processes on processors that belong to a particular node can directly access the memory within the particular node.

In shared-nothing systems, all processors, memories and disks are grouped into nodes. In shared-nothing systems as in shared-disk systems, each node may itself constitute a shared-everything system or a shared-disk system. Only the processes running on a particular node can directly access the memories and disks within the particular node. Of the three general types of multi-processing systems, shared-nothing systems typically require the least amount of wiring between the various system components.

FIG. 1 illustrates an example shared-nothing multiprocessor system with four nodes 110 including three banks of disks 150. Disk banks 151, 152 and 153 are local to nodes 111, 112 and 113, respectively. A coordinator process, master 120 running on node 113, has spawned four slaves, slave W 131, slave X 132, slave Y 133 and slave Z 134 running on nodes 111, 112, 113 and 114, respectively.

SHARED DISK/SHARED NOTHING DATABASES

Databases that run on multi-processing systems typically fall into two categories: shared-disk databases and shared-nothing databases. A shared-disk database expects all disks in the computer system to be visible to all processing nodes. Consequently, a coordinator process in a shared-disk database may assign any work granule to a process on any node, regardless of the location of the disk that contains the data that will be accessed during the work granule.

Shared-disk databases may be run on both shared-nothing and shared-disk computer systems. To run a shared-disk database on a shared-nothing computer system, as shown in FIG. 1, software support may be added to the operating system or additional hardware may be provided to allow processes to have direct access to remote disks. For example, software support may allow slave W 131 on node 111 to have direct access to disk bank 153 on node 113.

In general, however, a node's access to its local disks may be more efficient than its access to remote disks. For example, node 111's access to disk bank 151 is more efficient than node 111's access to disk bank 153. A node is said to have an "affinity" for the data stored on the node's local disks.

RELATIONAL STORAGE

Relational databases store information in indexed tables that are organized into rows and columns. FIG. 2 illustrates a sample table for an example relational database. Each row as 210 in the table 200 represents an individual record. Each column 220 in the table represents a different kind of information or "attribute" that is of interest for all the records. For example, Table Emp 200 stores employee records which contain columns 220 that correspond to the following attributes: employee name (Empname), employee number (Empno), social security number (SSN), department number (Deptno), Salary, job title (Title), date of employment (Startday), etc., in columns 221, 222, 223, 224, 225, 226 and 227, respectively. Each row 210 in the Table Emp 200 stores the same attributes for each individual employee, one attribute per column 220, but the values of an attribute stored in a column 220 may change. In this example, an employee record is uniquely identified by a social security number, SSN, column 223, or an employee number, Empno, column 222. In tables where none of the attributes are unique, a unique attribute called a ROWID may be generated for the record by the database. A user retrieves information from the tables by entering a request that is converted to queries by a database application program, which then submits the queries to a database server. In response to the queries, the database server accesses the tables specified by the query to determine which information within the tables satisfies the queries. The information that satisfies the queries is then retrieved by the database server and transmitted to the database application and ultimately to the user.

In a typical database system, data is stored in a table in an unordered form. As records are entered into a table, they are inserted into the next available location in a non-volatile, i.e., persistent, storage device, such as a fixed disk drive or optical device. Such a location can often be, relative to the location of the previous record, at a non-contiguous storage sector of the persistent storage device. Over time, as records are added or dropped, the physical arrangement of the data in the persistent storage device usually does not correspond to the order of values in any of the attributes of the table. The data for consecutive rows may appear to be randomly spread over a number of blocks in the persistent storage device. Consequently, it is not always possible to directly access or retrieve the record or range of records that satisfy a given set of search criteria. For example, in order to locate all rows in a table that have a given value in a column A, every row of the table must be fetched and column A of each row examined. Even when a row with the target value in column A is found, the remainder rows in the table must be fetched and column A examined, unless the values in column A are established to be unique.

Another problem associated with data retrieval is that, typically, data for a particular row is stored in one or more units of contiguous blocks in a persistent storage device. A block is the smallest quantity of data that can be read from a persistent store into dynamic memory. If a database system requires any information stored in a particular block, the database system must read the entire block into memory. To retrieve values for a target column of a table, the database system must read the entire block or all the blocks that have any data from that column of the table, rather than reading only that portion of the block or blocks that contain values from the target column of the table. Since values for the target column may be present in all or almost all the blocks of a table, the entire table or significant portion thereof must be read into memory in order to retrieve the column values. In such a case, the database server, in response to a query, performs a "full table scan" by fetching every row of the table and examining the column or columns referenced in the search criteria specified in the query. This retrieval can be very costly because, if the amount of the data for the columns not used in the query is very large, then the full table scan methodology becomes very inefficient due to the unnecessary amount of disk input/output.

INDEXES

Accordingly, in one approach to improving the efficiency of data retrieval, database systems provide indexes to increase the speed of the data retrieval process. A database index is conceptually similar to a normal index found at the end of a book, in that both kinds of indexes comprise an ordered list of information accompanied with the location of the information. Values in one or more columns of a table are stored in an index, which is maintained separately from the actual database table (the underlying base table). The ordered list of information in an index allows for quick scanning to find a target value or range of values. Moreover, since a conventional index stores only the values from one or more columns that serve as the key to the index, a pointer and a unique row identifier if necessary, the number of blocks of data being read into memory is significantly reduced as compared to a full table scan.

One structure that may be used for an index is a B-tree structure. The logical layout of a sample B-tree 300 for Table Emp 200 is illustrated in FIG. 3 for a case in which the key to the index, i.e., the index key, is Deptno, column 224. A B-tree index is a hierarchical arrangement of two types of elements: leaves and branches. Leaves reside at the lowest level of the B-tree hierarchy and are associated with a range of index key values. A leaf contains index entries for the rows that have index key values in the key value range associated with the leaf. Each entry in a leaf contains a key value and a unique row identifier that is used to locate, within the table, the row associated with the entry.

For example, FIG. 3 shows four leaves 310, 320, 330 and 340 that collectively hold the index entries associated with index key values (department numbers) ranging from 10 to 40. Specifically, leaf 310 holds the index entries for the rows with index key (Deptno) values 10 and 11. Associated with each index key value 311 is an employee number, Empno, from column 222, which serves as the unique row identifier 312. In other approaches, the rowid itself serves as the unique row identifier.

In some database implementations, one B-tree leaf is stored per block of persistent storage. However, the block used to store a leaf need not be filled by the index entries of the leaf. For example, part of the block may be empty to accommodate later additions to the leaf. When the leaf does not fill the block, the bits in the unused portion of the block are simply ignored. When an attempt is made to insert into a leaf more information than will fit on a block, the value ranges associated with the leaf and one or more other leaves are revised, and additional leaves may be created, to redistribute the index entries across the leaves in a way that prevents any individual leaf from being overloaded. Each leaf also contains a pointer or other link to the subsequent leaf. For example, leaf 310 points to leaf 320.

The other elements in the B-tree hierarchy are the branches. Branches contain information that indicates at least one range of values for the index key, and, for each range, a pointer or other link to the next lower element of the hierarchy, whether a leaf or another branch. The branch at the top of the hierarchy is called the root of the B-tree. By following the links from the root branch using the pointers associated with the range that includes the index key value of interest, the leaf containing that value can be found. The beginning of the ranges may be implied, and only the end of the ranges need be specified in a branch, as in FIG. 3. For example, in FIG. 3, the root 302 indicates two ranges, the first for index key Deptno values from 0 to 20, and the second for values from 21 to 40. If a Deptno value of 11 is of interest, the database server would follow the link associated with the range from 0 to 20, which indicates branch 304. Branch 304 indicates that the first range is from 0 to 11 and points-to a block of storage containing leaf node 310. Since the first range contains the value of interest, block 310 is retrieved. The Deptno value of 11 is found beginning in the second entry from the end of the leaf. Although FIG. 3 depicts leaf nodes that have separate index entries for every row (even though some rows have the same index key value), other arrangements are possible. For example, a single index entry may be used for each key value, e.g. 11, where index entry for any key value is followed by a list of row identifiers for the rows that have that key value.

DML OPERATIONS

Data in indexed tables, such as Table Emp 200 in FIG. 2, are manipulated with a set of commands which can be called Data Manipulation Language (DML) commands. Typically, the DML commands supported by database systems include, for example, commands to delete rows, insert rows, and update rows. The update row operation is often implemented as a delete row followed by an insert row. The delete row, insert row, and update row operations are referred to hereinafter as insert, delete, and update.

In a multiple-node system, to make use of the multiple nodes, database servers have been designed to support partitioned tables and parallel processing of DML commands. In a partitioned table, the rows of the table are grouped into distinct partitions that may be spread over multiple nodes. For example, FIG. 1 illustrates a database table that is partitioned into three partitions, Partition A 161, Partition B 162 and Partition C 163 on the disk banks 151, 152 and 153, respectively, local to nodes 111, 112, and 113, respectively.

The division of rows into partitions is usually based on the value of a table partition key defined by one or more columns of the table. For example, the Table Emp 200 can be divided among the three disk banks using employee number, Empno, in column 222 as the partition key. For purposes of illustration, Empno values from 1–100 may be stored in Partition A on disks 151 local to node 111, records of employees 101 to 200 may be stored in Partition B on disks 152 local to node 112, and rows for employees 201 to 300 may be stored in Partition C on disks 153 local to node 113.

Each node can maintain an index for the rows in its own partition of the table. Such indexes, which only index the rows that belong to a partition of a table and not the entire table, are referred to as local indexes. At least one of the nodes, e.g. node 113, may maintain a global index 170 for all the rows of the Emp table. A global index is an index that contains index entries for all rows of the table.

PARALLEL DML OPERATIONS

In a parallel processing system, DML operations are often divided into work granules which are spread across the nodes of the system for parallel execution. Such parallel DML (PDML) operations may be used where the database itself is partitioned, or where the operations are performed in bulk, or both. A bulk DML operation is a set of related DML operations that affects a large number of rows, such as when the salary of every employee in a 40,000 employee company is raised a given amount in an employee database.

During PDML operations, the PDML master process, herein called the Coordinator Process, CP, distributes DML operations among several slaves on corresponding nodes based, at least partly, on a key which is herein called a partition key. If the table involved in the PDML operation is statically partitioned, the partition key used to divide the work granules of the PDML operation may be the same as the key that was used to partition the table. If the table is not partitioned, then the partition key refers to the columns, if any, used to divide the PDML work granules for distribution among slaves.

UPDATING INDEXES

An index must also be updated to reflect changes to the table upon which it is built when (1) data in the one or more columns serving as an index key of the index are changed, or (2) data in the one or more columns serving as the unique row identifier used by the index are changed. For example, index 300 would have to be revised if values in the Deptno column 224 of table 200 are changed.

When the operation being performed on a table is a PDML operation, each slave involved in the PDML operation is responsible for modifying the global index to reflect the changes made by the slave to its assigned partition of the table. However, if the key upon which the global index is built is not the same as the partition key used divide the PDML operation, then maintaining global index becomes a bottleneck. For example, updating index 300 may become a bottleneck in a PDML operation performed on table 200 if Deptno is not the partitioning key used to distribute the work granules of the PDML operation.

Specifically, under these conditions, maintaining a global index during a PDML operation results in a loss of clustering, contention for resource locks, and block pinging. The proportional gains expected from parallel operations, e.g., halving the duration of operations when the number of processors used is doubled, are not observed. The observed gains are less, i.e., scaleable parallelism is not attained.

Clustering refers to the physical nearness to each other of the data items upon which a process operates. In general, the more closely clustered the data items that are accessed during an operation, the fewer the disk accesses required by the operation and, consequently, the more efficient the operation. Unfortunately, when the index key of an index is not the partitioning key used distribute the work of a PDML operation, the changes that any given slave has to make to the global index are not likely to be clustered. For example, a particular slave may be assigned rows that correspond to a particular range of Empno values. The rows that fall within that range of Empno values may have Deptno values that correspond to index entries that are randomly distributed within the leaves of index 200. Without clustering, the benefits of caching are reduced.

With respect to contention, different slaves may have to contend for the same global index block at the same time. For example, different slaves may be updating table rows that correspond to index entries in the same index block, and thus different slaves may have to update the same index block. On a shared-everything system, memory is shared and block contention causes slaves to wait for each other to have access to the block, e.g., for a latch/lock manager to make the block available to the slave for the desired operation. On such a system, the second slave requesting the block must wait for the first node to release the latch/lock on the block.

On a shared-disk or shared-nothing system, block contention can cause block pinging. On such a system, the request for the block by the second node is granted only after the first node flushes the block from its cache to persistent storage and releases the lock. Then the node of the second slave reads the persistent storage device to retrieve the block and places the block in its cache for the second slave. The first node will then request the lock manager to get the block back. After the second slave makes a single or limited number of changes, the second node will flush the block from its cache onto the persistent storage. Then the lock manager will allow the first node to obtain a lock on the block. The same block can thus be shuttled back and forth between the persistent storage device and the nodes that are executing the alternating two (or more) contending slaves. Further, it is possible that none of the contending slaves are on the node for which the persistent storage device is local. If none are local, transmissions and extra overhead to read or write to a non-local disk are also required, consuming even more system resources.

For example, when the persistent storage device is a disk, each block ping implies two disk input/output (I/O) operations, one flush to the disk from the cache of the first node, and one read back from the disk into the cache for the second node. Block pinging is worse than the delays experienced by a shared-everything system because block pings not only delay results but also consume system I/O resources. These block pings make the PDML with a global index typically worse for shared-nothing and shared disk systems than for a shared everything system.

For example, assume that table 200, partitioned by Empno as shown in FIG. 1, requires a bulk update setting Deptno= Deptno+1 for all records. To perform the update, the master process, CP, forms three work granules to distribute to three PDML slaves. Slave W 131 on node 111 updates Partition A that contains rows with Empno values from 1 to 100, slave X 132 on node 112 updates Partition B that contains rows with Empno values from 101 to 200, and slave Y 133 on node 113 updates Partition C that contains rows with Empno values from 201 to 300. The same slaves will update the local indexes associated with their partitions.

If a global index 170 maintained on disk bank 152 of node 112 uses Deptno as an index key, that index also must be updated because the values of Deptno have been changed. Using conventional PDML techniques, slave W 131 updates the global index 170 for employees 1 to 100, slave X 132 updates the global index 170 for employees 101 to 200, and slave Y updates global index 170 for employees 201–300. FIG. 3 shows that to update Deptno for employee 100, slave W 131 must read leaf block 310; and, to update employee 101, a different slave, slave X 132, also must update leaf block 310. Because slave W 131 does not know about the update being made by slave X 132, the two updates are not coordinated and two separate reads of block 310 into cache and two separate flushes from cache occur. The benefits of caching are lost.

On a shared-nothing system, as in FIG. 1, after slave X 132 has completed the update of Deptno for Empno "101" and before slave X 132 has updated Deptno for Empno "102," the block may be requested by slave W on node 111. Then node 112 flushes the block from its cache and writes the block to disk. Then node 111 causes a read of the block from disk and transmission of the block to node 111 where it is placed in the cache of node 111; and the Deptno value for Empno "1" is updated by slave W 131. But before slave W 131 can update Deptno for Empno "2," slave X may have requested block 310 for updating Deptno for Empno "102." Consequently, node 111 flushes the block from its cache, transmits it to node 112 which stores it on disk 152, then node 112 reads the block from disk into the cache on node 112 for slave X 132. Slave X updates Deptno for Empno "102." Slave W may then request the block again and node 112 again flushes the block from cache to disk 152 so node 111 can access it. Thus block 310 pings repeatedly from cache to disk to cache, heavily consuming I/O resources in the process.

The need to achieve scaleable parallelism thus translates to a need to update a global index as a result of PDML operations without suffering the deficiencies of lost clustering, or contention for the same block, the latter leading to excessive waits or to block pinging.

SUMMARY OF THE INVENTION

Techniques are provided for coordinating an update of a global index of an indexed table. According to one technique, a coordinator process receives index maintenance records from a plurality of data manipulation slaves for the indexed table. Each index maintenance record includes a value for an index key of a global index of the table. The coordinator process computes a plurality of ranges of index key values, and assigns to each of a plurality of index update slaves those records that fall in each range of the plurality of ranges. Each index update slave updates the global index based on the records assigned to it.

In another aspect of the invention, each slave reads an index key value from a current index maintenance record, and updates the global index using the current index maintenance record if the index key value falls within the range of values assigned to the slave.

In another aspect of the invention, techniques are provided in which an index update distribution table is sent from a coordinator process to an index update slave process. The table maps index key value ranges to slave identifications. The index update slave reads an index key value from a current index maintenance record, and locates the range in the index update distribution table that encompasses the value read. If the slave identification associated with the located range corresponds to the identification of the slave, the slave updates the global index using the current index maintenance record.

In another aspect of the invention, techniques for maintaining a global index of a table during parallel data manipulation operations involve a coordinator process, data manipulation slaves and index update slaves. The coordinator process distributes data manipulation operations among a plurality of data manipulation slaves. Each data manipulation slave performs data manipulation operations on rows of the table and sends an index maintenance record containing an index key value to the coordinator process. The coordinator process receives index maintenance records from the plurality of data manipulation slaves, computes a plurality of index key value ranges, and sends each range to a respective index update slave. Each index update slave reads a index key value from a current index maintenance record, and updates the global index using the current index maintenance record if the index key value falls within the range of values assigned to the index update slave.

In another aspect of the invention, techniques for using a global index includes performing a data query using the global index to provide a query result. If an out-of-date flag indicates the global index is not current, then a set of sorted index maintenance records, each record containing a value of an index key for the global index and an index operation, is searched for a match to the index key values used in the data query. The query result is modified according to the index operation.

DESCRIPTION OF THE DRAWINGS

The present invention is illustrated by way of example, and not by way of limitation, in the figures of the accompanying drawings and in which like reference numerals refer to similar elements and in which:

FIG. 2 is a schematic diagram of an example database table Emp for an employee database upon which an embodiment of the invention may operate.

FIG. 6 is a schematic diagram of an example set of index maintenance records for coordinating index updates according to one embodiment of the present invention.

Figure 5:
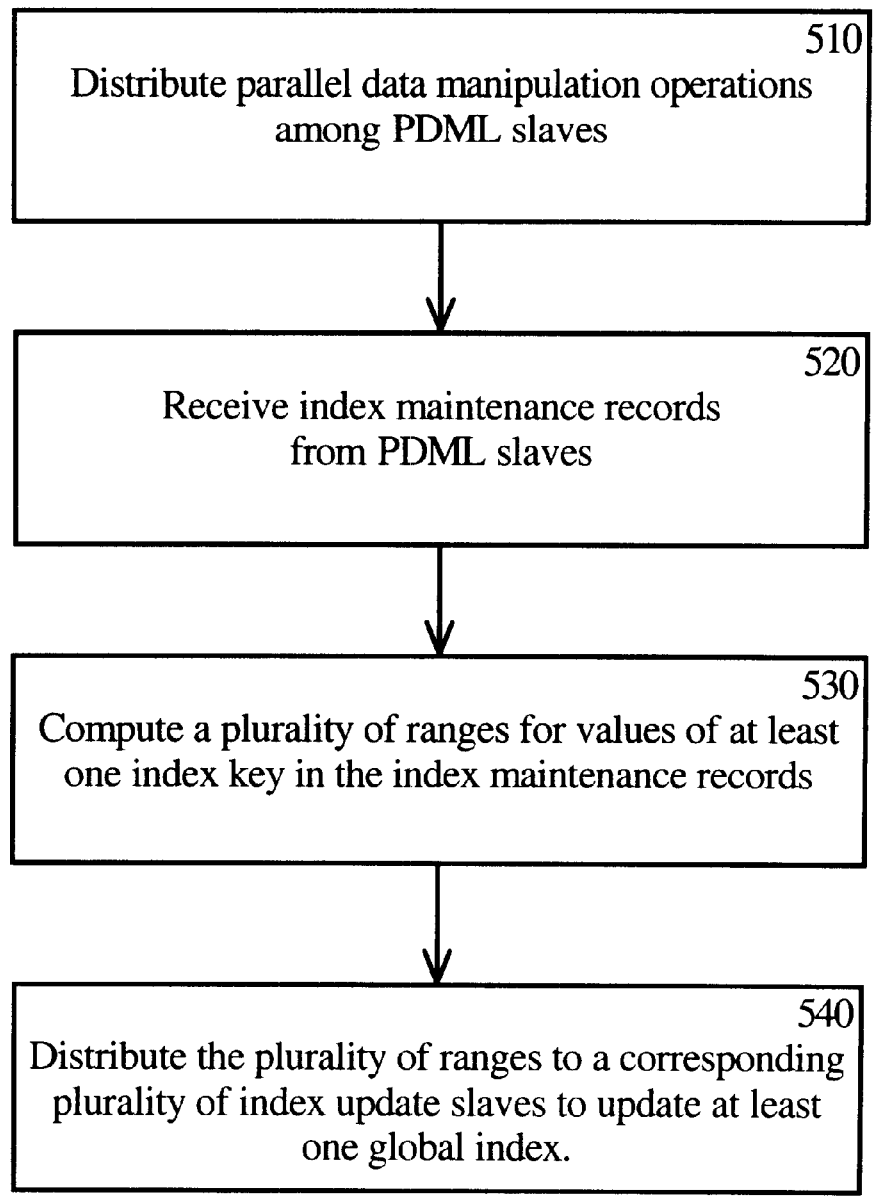
FIG. 5 is a flowchart of a coordinator process according to an embodiment of the present invention.

Table 10 is a flowchart detailing the step 540 of FIG. 5 according to another embodiment of the present invention.

FIG. 11 is a schematic diagram of an example index update distribution table for coordinating index updates according to another aspect of the present invention.

Figure 12A:
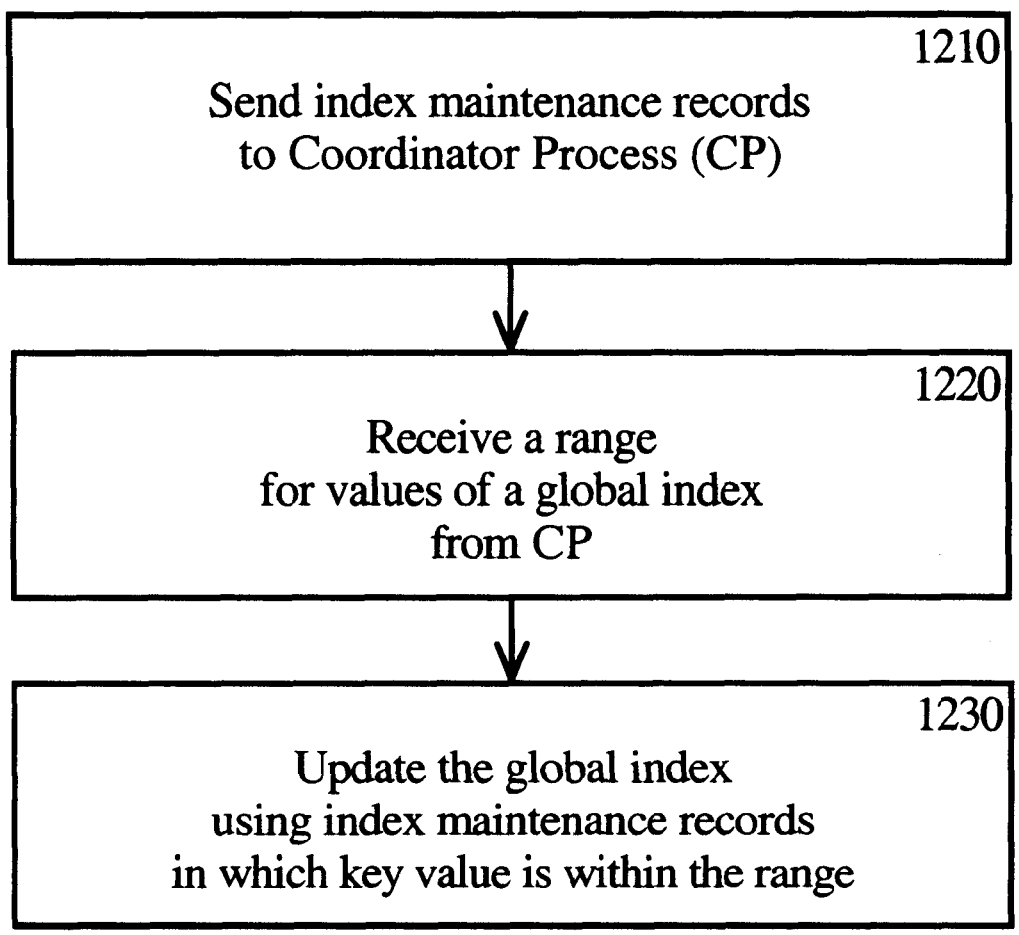

FIG. 12A is a flowchart of a slave process according to an embodiment of the present invention.

Figure 12B:
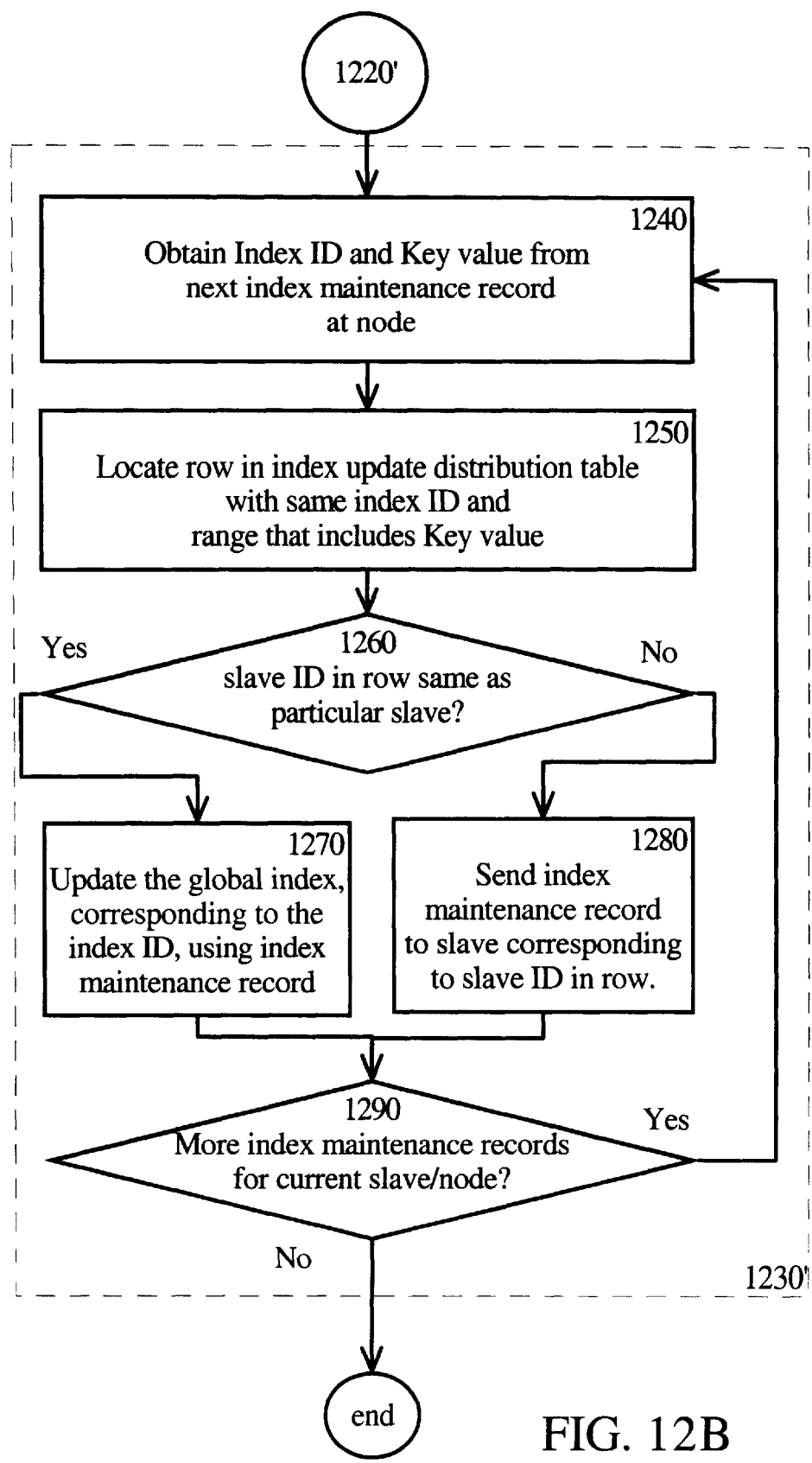

FIG. 12B is a flowchart detailing the step 1230 of FIG. 12A according to another embodiment of the present invention.

Figure 13:
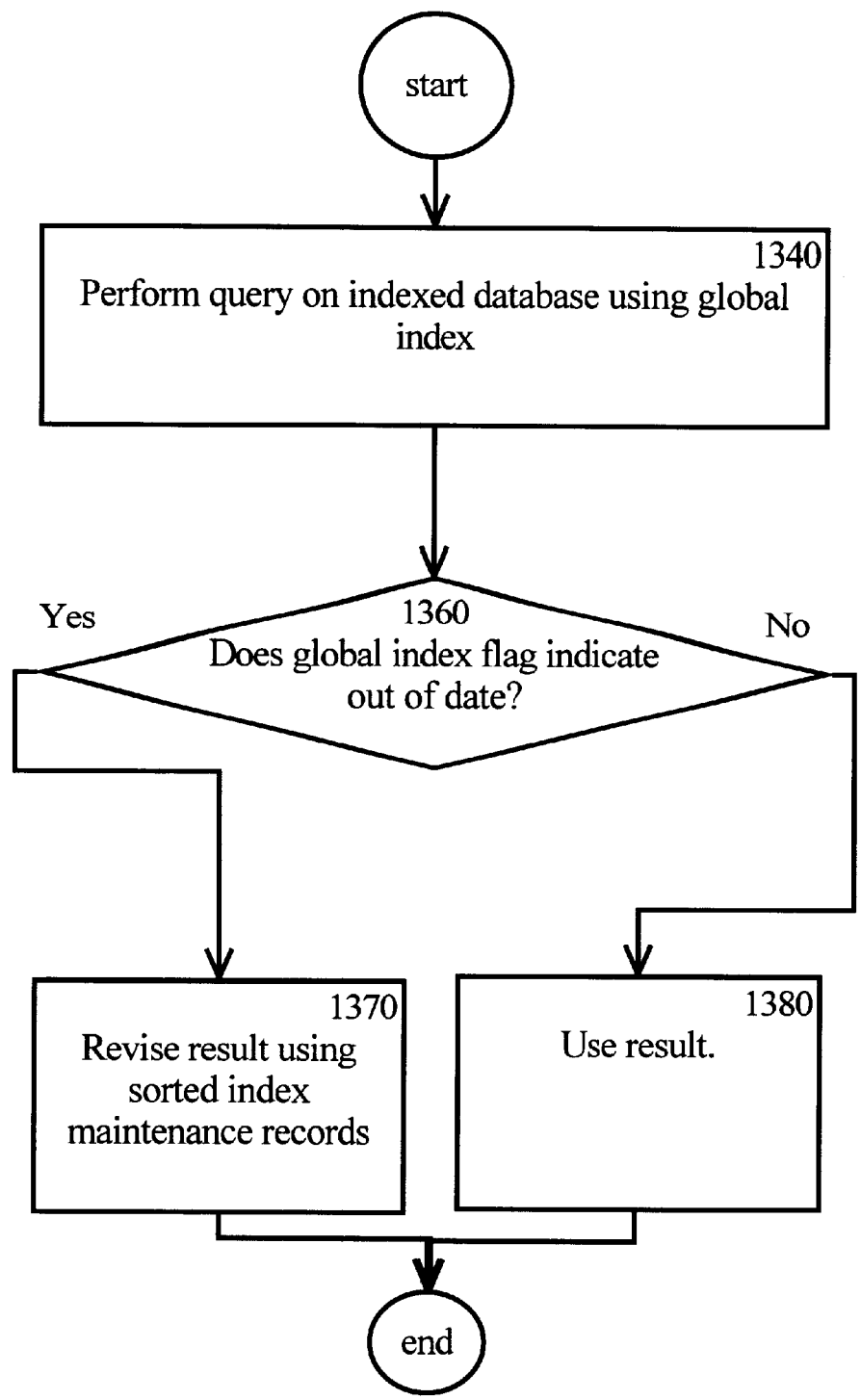

FIG. 13 is a flowchart of a query process using a global index according to another aspect of the present invention.

DETAILED DESCRIPTION OF THE PREFERRED EMBODIMENT

A method, product and system for parallel global index maintenance is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
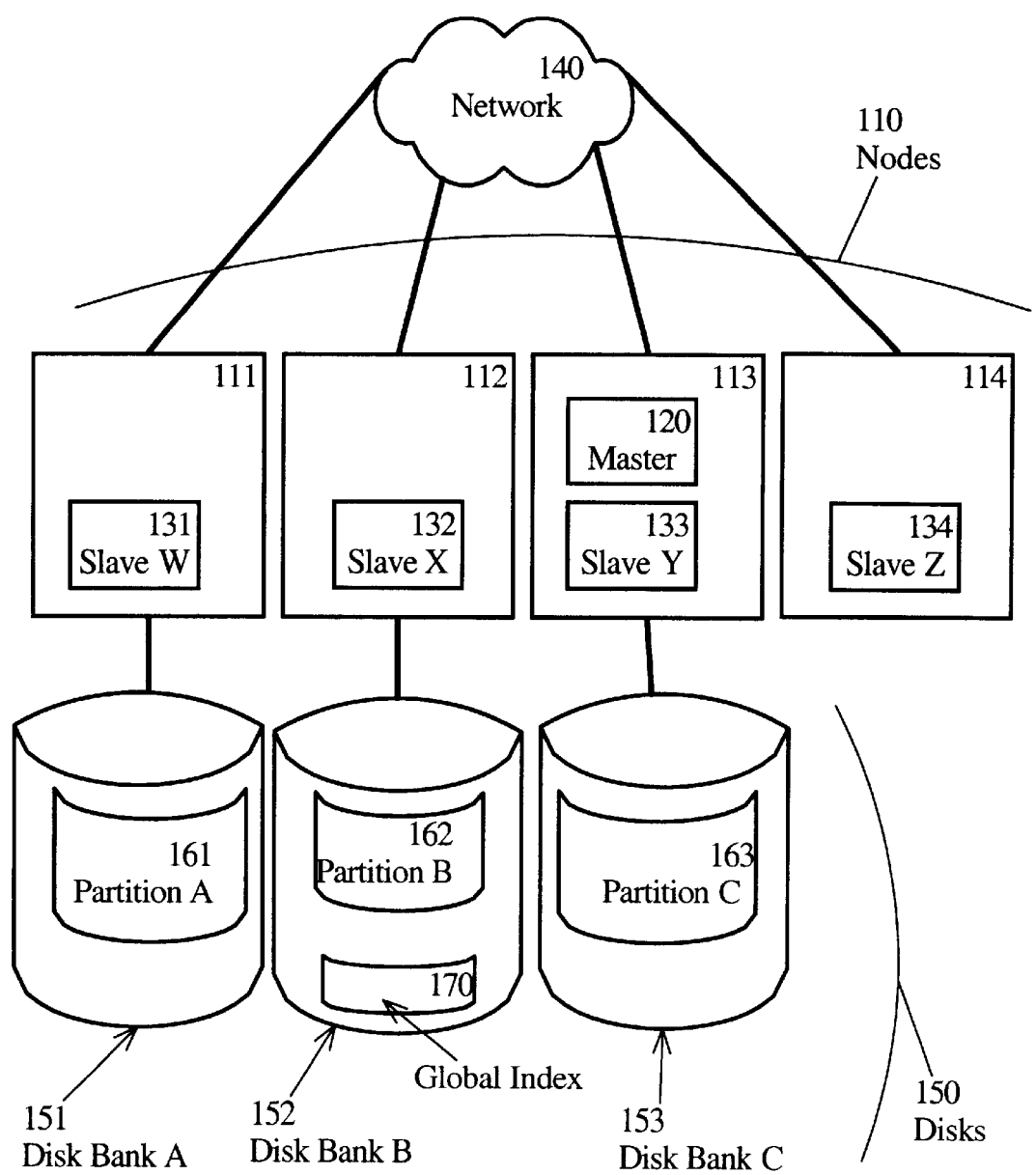
FIG. 1 is a block diagram of a database running on a multiprocessor system according to a conventional arrangement.
Figure 3:
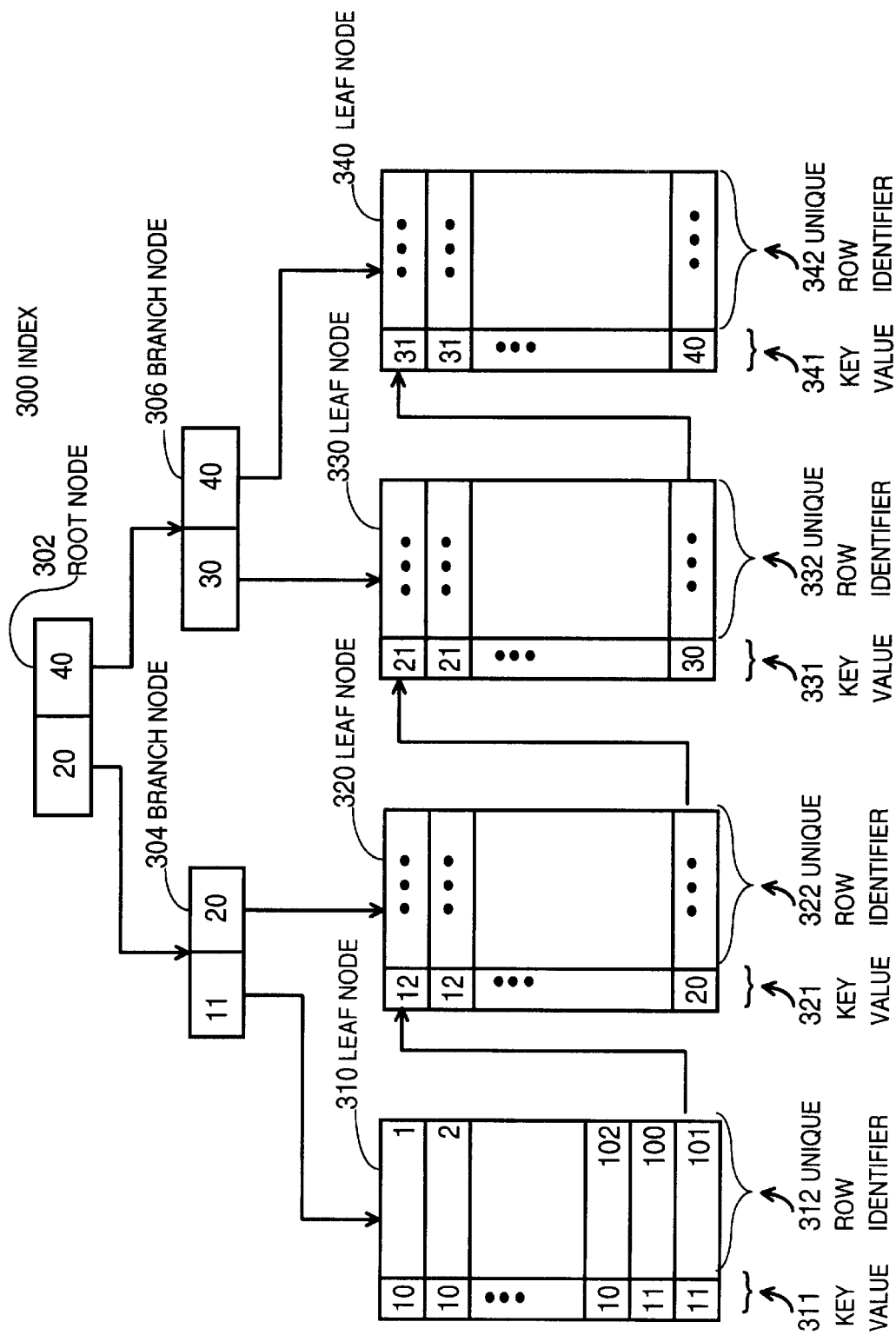
FIG. 3 is a schematic diagram of an example B-tree index for the example table Emp of FIG. 2, upon which an embodiment of the invention may operate.
Figure 4:
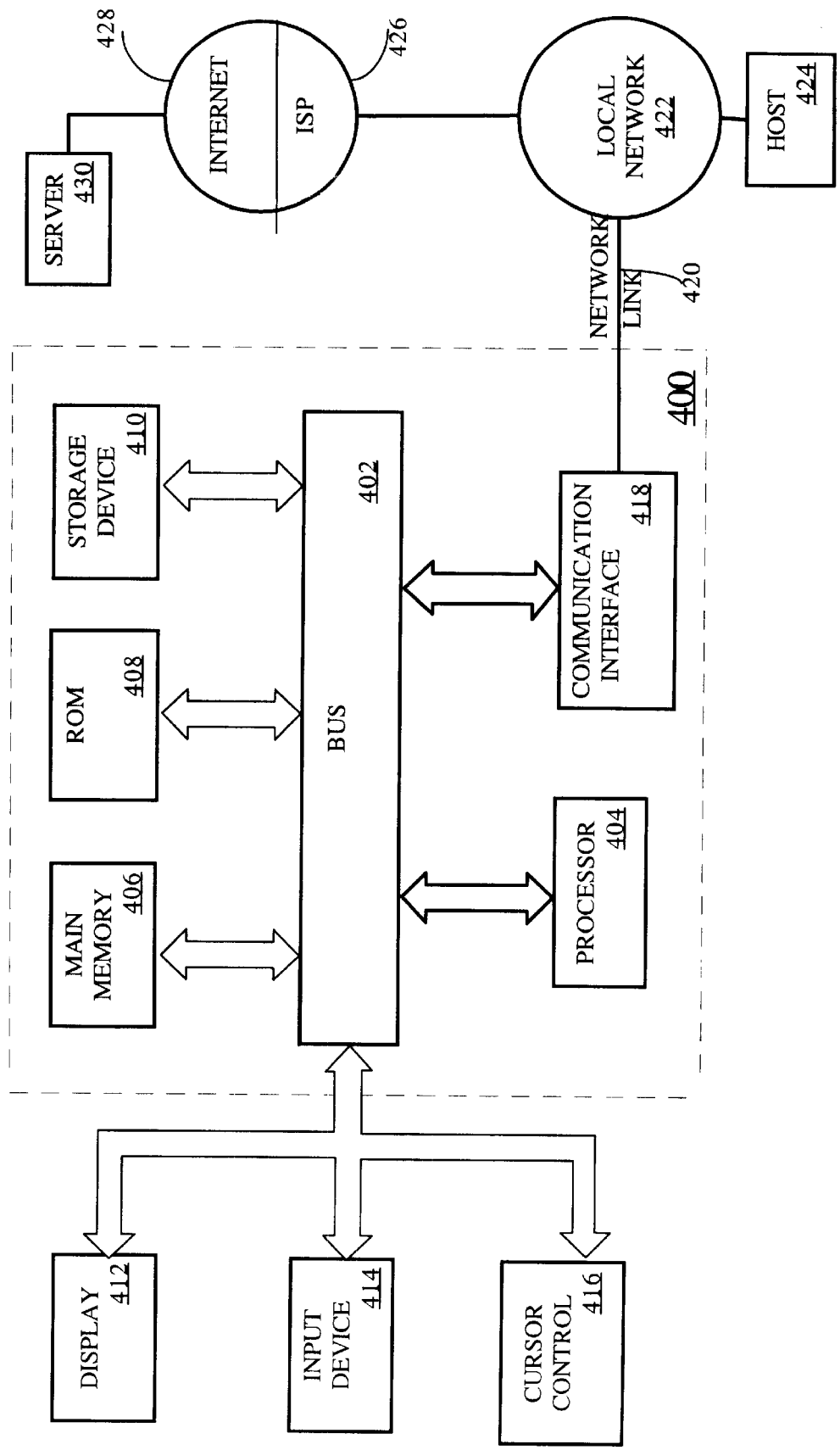
FIG. 4 is a block diagram of a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of one or more computer systems 400 for parallel global index maintenance. According to various embodiments of the invention, a master process or a slave process is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing information or instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code or message for an application program through Internet 428, ISP 426, local network 422 and communication interface 418. In accordance with the invention, one such downloaded application provides for an index update slave and an index update distribution table, as described herein.

The received code may be executed by processor 404 as it is received, and/or stored in storage device 410, or other non-volatile storage for later execution. In this manner, computer system 400 may obtain application code in the form of a carrier wave.

FUNCTIONAL OVERVIEW

To achieve scaleable parallelism during execution of a DML operation on an indexed table, the present invention makes disjoint (1) the data sets operated on by the slave processes during the table manipulation phase of the DML operation, and (2) the data sets operated on by the slave processes during the global index maintenance phase of the DML operation. According to one embodiment, this is accomplished by adding functionality to the coordinator process (CP) used to coordinate the parallel data manipulation operations. In some embodiments, functions are also added to the slaves running on the parallel processors. The CP is modified according to one embodiment of the present invention to redistribute the index updates among the available slaves in a manner that (1) avoids contention between the slaves for the same index block, and (2) increases the clustering of the index updates for which each slave is made responsible. In another embodiment, index update slaves may sort data indicating index updates to increase the clustering.

FIG. 5 is a flowchart of a coordinator process (CP) according to one aspect of the present invention. The modified CP distributes data manipulation operations among parallel data manipulation slaves (step 510), as in the conventional CP. When a PDML slave manipulates data in the database that affects an index key, the PDML slave generates an index maintenance record specifying (1) the index key value affected and (2) the operation to perform on the index, as will be described below in more detail. By writing index maintenance records, the index update can be delayed to a separate phase following completion of the data manipulation phase. Consequently, the PDML slaves which generated the index maintenance records do not have to apply the changes to the index. Instead, the CP receives some or all of the index maintenance records from all the PDML slaves (step 520), for example as messages transmitted over the network. In this manner the CP becomes the only process that is informed of the extent to which index keys must be updated. This information is used by the CP to redistribute the index updates among the available nodes.

As shown in FIG. 5, the CP next computes a plurality of index key value ranges in step 530. One range is computed for each node available to perform processing on the index. This may be the same as, more than, or less than the number of nodes available for performing the table manipulation phase of the PDML operation. The CP distributes the ranges to a set of index update slaves in step 540, one such slave on each available node. This way the slaves may be provided with non-overlapping ranges, for example, in which each index update slave can work without danger of substantial contention for the same leaf block of the index. Furthermore, each index update slave may sort index updates according to the values of the index key within the range, to increase clustering and thus take advantage of caching.

INDEX MAINTENANCE RECORDS

When a slave performs a DML operation on rows that belong to an indexed table, the slave generates index maintenance records that indicate how the indexes of the table must be changed to reflect the changes made by the slave. As was mentioned above, the modified CP receives index maintenance records from the PDML slaves in step 520. FIG. 6 shows a set of index maintenance records 630 according to one embodiment of the invention. In FIG. 6, each index maintenance record includes an index ID in the first field 611, a key value in the second field 612, and a data identification value (Data ID) in the third field 613.

The Index ID value identifies the particular index that needs to be changed based on the index maintenance record. For example, index maintenance records 621 to 626 indicate changes that need to be made to the index associated with Index ID=1. Index maintenance records 631 and 633 indicate changes that need to be made to the index associated with Index ID=2.

The Key value of an index maintenance record indicates the index key value of the row that corresponds to the index maintenance record for the index identified in the Index ID value stored in the index maintenance record. For example, index maintenance record 621 corresponds to a row where Deptno=10. The index indicated in the Index ID column of index maintenance record 621 is built on the Deptno column. Hence, index maintenance record 621 stores the Key value 10.

The Data ID value of an index maintenance record is used to uniquely identify the row in the indexed table that corresponds to the index maintenance record. For example, an index maintenance record that is generated in response to the insertion of a row X would have a Data ID value that uniquely identifies Row X. To uniquely identify the row that corresponds to an index maintenance record, the Data ID field of the record contains the contents of one or more columns, or the ROWID, that uniquely determines the corresponding row of the index maintenance record. The value in the Data ID field of an index maintenance record that corresponds to a row is also included in the index entry for that row, and therefore may be used to identify the index entry for the row when the index key value of the row is not unique. If the index key upon which an index is built is a database column that is subject to a uniqueness constraint, then the index key value of an index maintenance record for that index uniquely identifies the row. Hence, no separate Data ID value is necessary to uniquely identify the row, and the contents of the Data ID field may be the null value (NULL).

Each index maintenance record corresponds to a row. The row to which an index maintenance record corresponds is the row whose manipulation caused the generation of the index maintenance record. Index maintenance records indicate changes that need to be made to indexes in response to changes that are made to tables.

The index maintenance records therefore also include an Opcode field 614 which indicates the operation that must be performed on the index entry identified by Key value and Data ID.

For example, suppose the database table Emp 200 illustrated in FIG. 2 is indexed by the Deptno column 224. Deptno 224 is not unique, so employee number, Empno in column 222, is used as the unique row identifier. Then the bulk data manipulation command to increment the department number by 1, i.e., increment the contents of Deptno 224 by 1, will change an index key value in every row of the database table Emp 200. For example, Fred (Empno "1") in row 211 has his Deptno changed from "10" to "11." Consequently, many index maintenance records will be generated. FIG. 6 illustrates six of the index maintenance records 621 to 626 that might be produced in response to this operation. The change of Deptno index values associated with Fred is indicated by a "delete" Opcode where the Key value is "10" and Empno is "1" (see record 621 of FIG. 6), and by an "insert" Opcode where the Key value is "11" and Empno is "1" (see record 624).

The Key value, Data ID and Opcode fields, 612, 613 and 614, respectively, are included in conventional index maintenance records used by data manipulation slaves. According to one aspect of the present invention, the index maintenance records are modified to include the index identification (Index ID) so that several global indexes on the same database can be maintained with the same set of index maintenance records.

For example, suppose that Table Emp illustrated in FIG. 2 is indexed separately by two columns, Deptno 224 and Salary 225. Then, a data manipulation command that deletes all records from the database where the employee start date is November 1 of any year, will cause Betty and Alice, rows 213 and 216 in FIG. 2, respectively, to be deleted from the database table Emp 200. The required updates to maintain the index by the deletion of Betty includes deleting a Deptno of "12" (the value in Deptno after the bulk increment of Deptno described above) in one global index, and deleting a salary of $45,000 in the other index. To keep separate the changes to the two indexes, the index maintenance records are modified to include the Index ID 611. In FIG. 6 an Index ID of "1" indicates the Deptno index and an Index ID of "2" indicates a Salary index. Thus changes to both global indexes can be recorded in the same set of index maintenance records 630. Additional details concerning the use of the modified index maintenance records are described later below.

DISTRIBUTING INDEX MAINTENANCE RECORDS

As indicated at step 540 of FIG. 5, the CP distributes the work associated with index maintenance records to a plurality of index update slaves. However, this distribution is not made based on the same partitioning criteria that was used to distribute the work granules during the table update phase of the PDML operation. Rather, the CP distributes the index maintenance work granules based on the values in the Key value column of the index maintenance records.

According to one embodiment, the CP determines an overall range of index key values for each index from these records. Assume, for example, that the complete Table Emp 200 has department numbers that vary from "10" to "39," so that the overall range of key values then would be 10 to 39. The task of modifying the index for this overall range of key values is split among several nodes. If three nodes are available, three slaves divide the task—each slave taking, for example, ten values (one third of the overall range). Therefore the CP would define three ranges at step 530 of FIG. 5, where the first range is from 10 to 19; the second range is from 20 to 29; and the third range is from 30 to 39. Other procedures to generate the ranges are possible and desirable as will be described in more detail later. According to step 540, the modified CP would assign each of the three ranges to a respective one of three index update slaves. Thus, for example, the range 10–19 is assigned to index update slave 1, the range 20–29 is assigned to index slave 2 and the range 30–39 is assigned to index update slave 3. After assigning a range to an index update slave, the CP distributes to the slave all index maintenance records that have key values that fall within that range. Other ways to distribute the index maintenance records are also possible and desirable as will be described below in more detail.

UPDATING GLOBAL INDEXES

Upon receiving index maintenance records, the index update slaves update the global index using index maintenance records in which the key value falls within the range assigned to each slave. This process is described in more detail below. Because each slave has a non-overlapping range, there is little or no contention for the same leaf block—thus latch contention and block pinging are drastically reduced. If each index update slave processes the index maintenance records in order of increasing or decreasing key value, then the updates to the index will be clustered and the advantages of caching will also accrue to the process. In this way, many of the disadvantages of conventional global index updating operations are overcome.

EXEMPLARY PDML OPERATION

Figure 7:
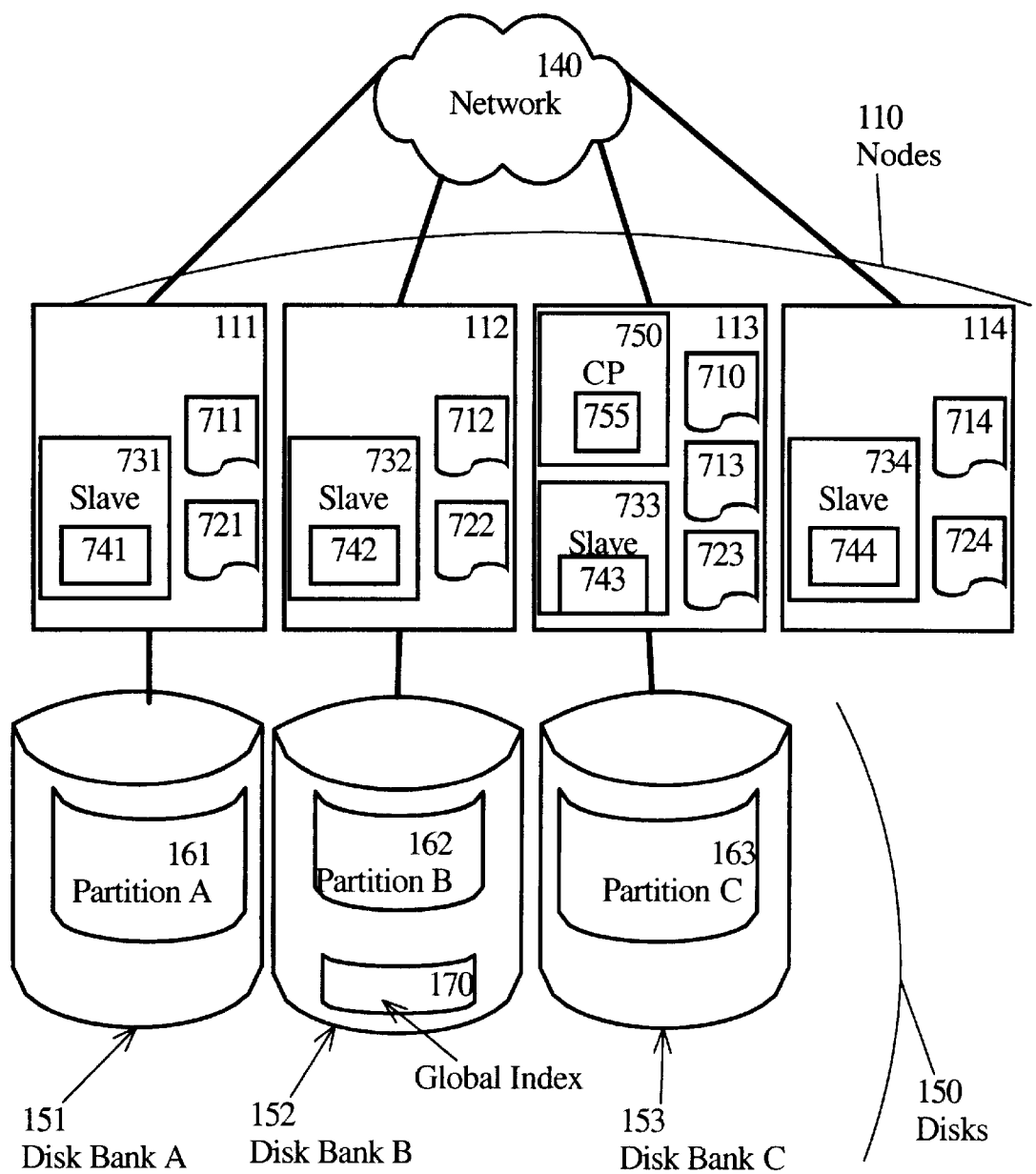
FIG. 7 is a block diagram of a database running on a multiprocessor system according to an embodiment of the present invention.

Referring to FIG. 7, the flexibility of the PDML techniques provided herein are described. FIG. 7 illustrates a shared-nothing multiprocessor system according to one embodiment of the present invention. In the system, a partitioned database table made up of partitions A 161, B 162 and C 163 is stored on nodes 111, 112 and 113, respectively. A global index 170 for the table is located on node 112.

A coordinator process (CP 750) executing on one of the nodes manages execution of a PDML operation performed on the table. Slaves 731, 732, 733 and 734 are shown running on each of four processing nodes 111, 112, 113 and 114, respectively. In the illustrated embodiment, the same slaves 731, 732, 733 and 734 are used to perform both the data manipulation operations during the data manipulation phase of a PDML operation and the global index updates during the global index update phase of the PDML operation. To that end, the slaves are modified to include index update logic 741, 742, 743 and 744. Alternatively, the global index update phase of a PDML operation may be performed by a different set of slaves than is used to perform the data manipulation phase of the PDML operation.

The index maintenance records 711, 712, 713 and 714 represent the records generated by each data manipulation slave. These records are sent from the slaves that generated them to CP 750. Records 710 represent the set of index maintenance records 710 received by the CP from the data manipulation slaves 731, 732, 733 and 734. As described above, these records 710 may include an Index ID to distinguish among more than one global index.

When the CP distributes the data manipulation work granules, the number of PDML slaves utilized may vary. For example, if the PDML operations are partitioned the same way as the database table, then only three PDML slaves will be used, those on node 111, 112 and 113, respectively, because these are the nodes with partitions of the table. Node 114 is not used. Alternatively, to make the most use of available processors, some of the PDML operations may be assigned to node 114. Because node 114 has less affinity for the rows of the database tables than the other three nodes, node 114 may be assigned a work granule with fewer than one fourth the total DML operations, according to various schemes for distributing tasks known in the art.

As mentioned above, the number of slaves used during the data manipulation phase of a PDML operation need not equal the number of slaves used during the index update phase of the PDML operation. Thus, even if the DML operations are confined to nodes 111, 112 and 113, all four nodes may still be utilized for the index update slaves. Only node 112 has a strong affinity for the global index in the example illustrated in FIG. 7. Thus, node 114 is no less qualified to update the global index than are nodes 111 or 113. Consequently, even if only three PDML slaves are used, the CP can choose to divide the index update task among four index update slaves, with index update slave 742 on node 112 perhaps receiving a greater share of the load because of its greater affinity for the disk on which the global index resides, again, allocating shares according to various schemes for distributing tasks known in the art.

DISTRIBUTING WORK BASED ON INDEX KEY VALUE RANGES

Figure 8A:
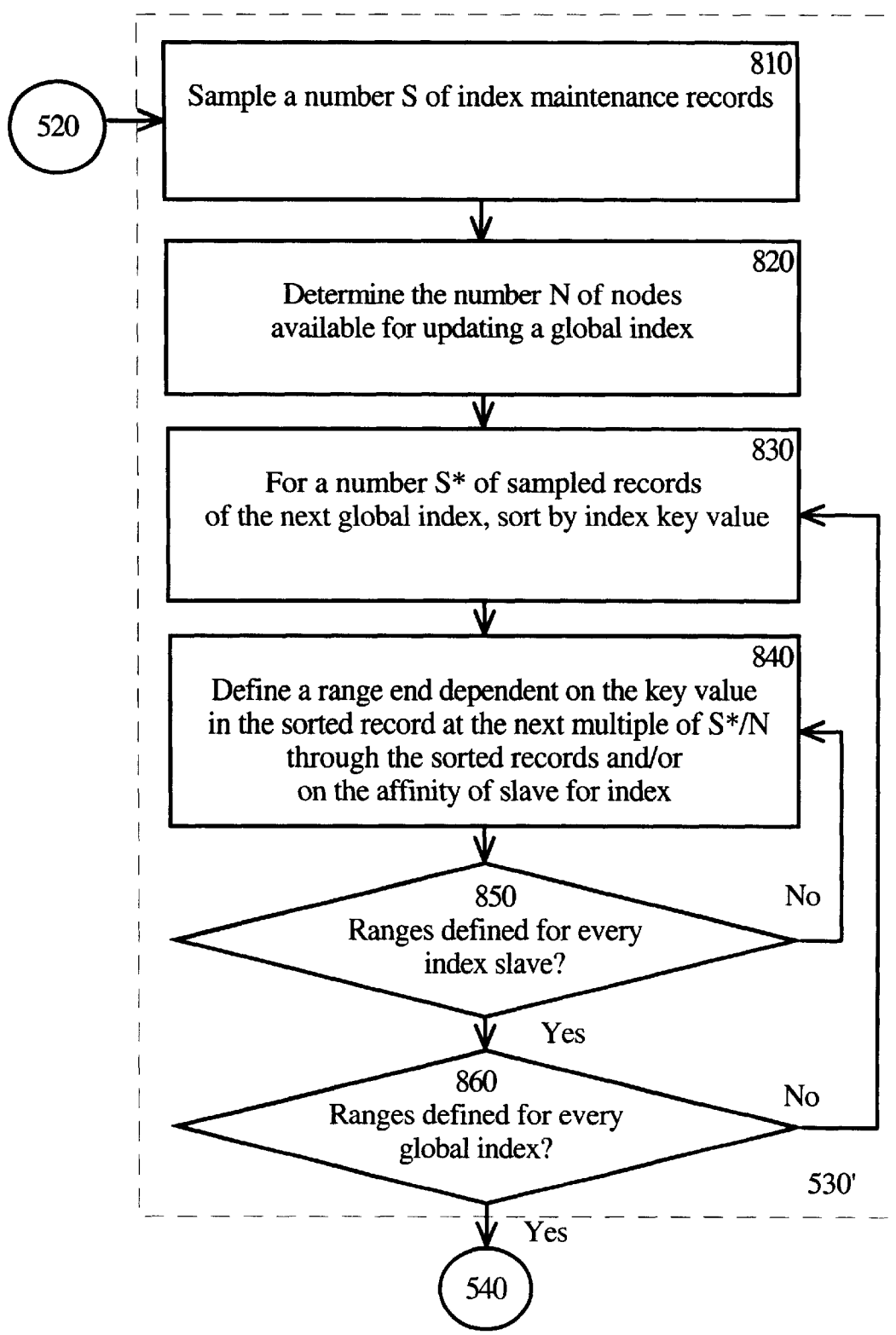
FIG. 8A is a flowchart detailing the step 530 of FIG. 5 according to another embodiment of the present invention.

FIG. 8A is a flowchart detailing the step 530 of FIG. 5 according to an embodiment of the present invention. According to this embodiment, instead of assuming an equal distribution of index key values between a minimum and maximum value, the actual distribution of key values is examined to achieve better loading among the index update slaves.

First, a sample of S records of the index maintenance records is obtained 810. The number S can be all the records produced during the PDML operations. That is, the entire population of records can be sampled. Alternatively, a predefined large quantity that is expected to give good statistical representation of the population can be chosen for S, such as 1000 records. In an alternative embodiment, a constant percentage of the index maintenance records is utilized as the sample, e.g., every fiftieth record is sampled during the PDML operations. Next, the number of available nodes is determined to establish the number N of index slaves among which to divide the task of updating the index 820. N is then the degree of parallelism for the index update.

The number S* of index maintenance records belonging to a particular global index is determined in preparation for sorting. If there is only one global index, as with the conventional index maintenance records, then S* is equal to S. If there are multiple global indexes, then there are multiple values of Index IDs in the modified index maintenance records and there are two choices for S*. One choice is that the Index ID is added as the most significant digits to the Key values and all records are sorted together. In this case, again S* is equal to S. As will be shown later, it is preferable to keep different index IDs separate from each other and sort only within one Index ID. In such a case, S* would be less than S. For example, if both Deptno and Salary are global indexes and many table rows were deleted, then about half of the index maintenance records have an index ID for Deptno and the other half have an index ID for Salary (see records 631 to 634 in FIG. 6). In this case S* is about S/2. The S* records are then sorted by key index value.

The ranges are then defined by reading the key values associated with each multiple of S*/N from the sorted records in step 840. The beginning of the first range is assumed to be zero, or any value known to be less than the minimum value for an index key, e.g. −9999. The end of the first range is the value at the S*/N location, rounded to the next smaller or larger integer. For example, if N, the degree of parallelism, is 3 and S* is 299, then S*/N is 99 or 100. If 99 is chosen, then the end of the first range is the value of the key index in the 99$^{th}$ position of the sorted S* samples. The computation may be repeated for every index slave as in step 850. For example, the end of the second range is at the position defined by 2 (S*/3) which may be computed as 598/3=199, i.e. the value of the key index at the 199$^{th}$ position (2*99 =→198$^{th}$ position would also be acceptable). The end of the last range would be the last sorted position (=→3* 299 /3) or some number known to be larger than the largest value of the key index, such as 10,000,000,000. Assuming, for example, that there are many more employees in departments 10 and 11 than in the rest of the departments combined, then the 99$^{th}$ position may hold the Deptno value "10", the 199$^{th}$ position may hold the Deptno value "12" and the last position would hold the Deptno value "40". The three ranges would then be 0–10, 11–12, and 13–40 (or 13–10,000,000,000). The three ranges derived from the samples would give a more even loading of the three index update slaves than the uniform distribution of 10–19, 20–29 and 30–39 given above. The uniform distribution would put updates of index key values 10–19 on the first index slave, which would include more than half of all index maintenance records in this example.

If there are multiple global indexes, then the system returns to step 830, sorting on the index key values of the next Index ID, until a set of N ranges has been defined for every index ID as checked in step 860.

Figure 8B:
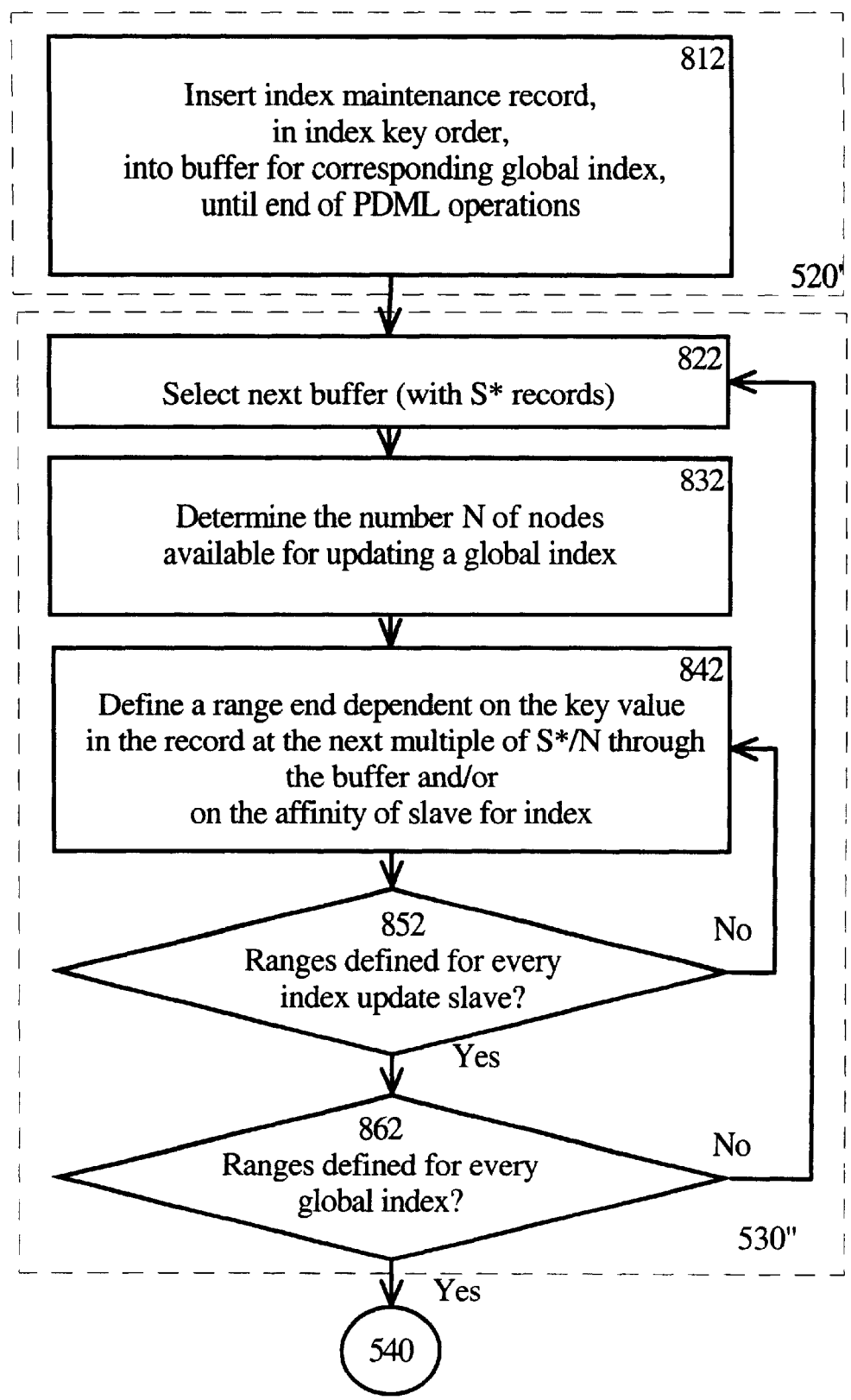
FIG. 8B is a flowchart detailing the steps 520 and 530 of FIG. 5 according to an alternative embodiment of the present invention.

In a preferred embodiment, illustrated in FIG. 8B, the PDML slaves do the sorting and sampling before sending the index maintenance records to the CP. For example, each PDML slave maintains a buffer for each global index affected by the manipulation of data in the table. During a Phase I, as each DML operation is performed by a PDML slave, an index maintenance record for each affected global index is generated and placed in the buffer devoted to that index. For example, three PDML slaves affecting two global indexes would produce up to six buffers, two private buffers on each of the three nodes running PDML slaves, each buffer on the same node for a different global index.

As modified according to this embodiment, after all PDML operations are complete, i.e., after Phase I and during a Phase II, the PDML slave sorts the index maintenance records in each buffer. After sorting each buffer, the modified PDML slave selects a sample from each buffer according to one of the sampling methods, for example, selecting every Mth record in the buffer, where M is a constant integer, such as 100. The modified PDML slave then sends the samples to the CP. By having the modified PDML slaves do the sampling, traffic between nodes is reduced, saving system resources.

In this embodiment, the sampling by the PDML slave replaces the need for sampling shown in step 810 of FIG. 8A. Also, the separate buffers of the PDML slaves and the CP replace the need for subsampling shown in step 830 of FIG. 8A.

Figure 9:
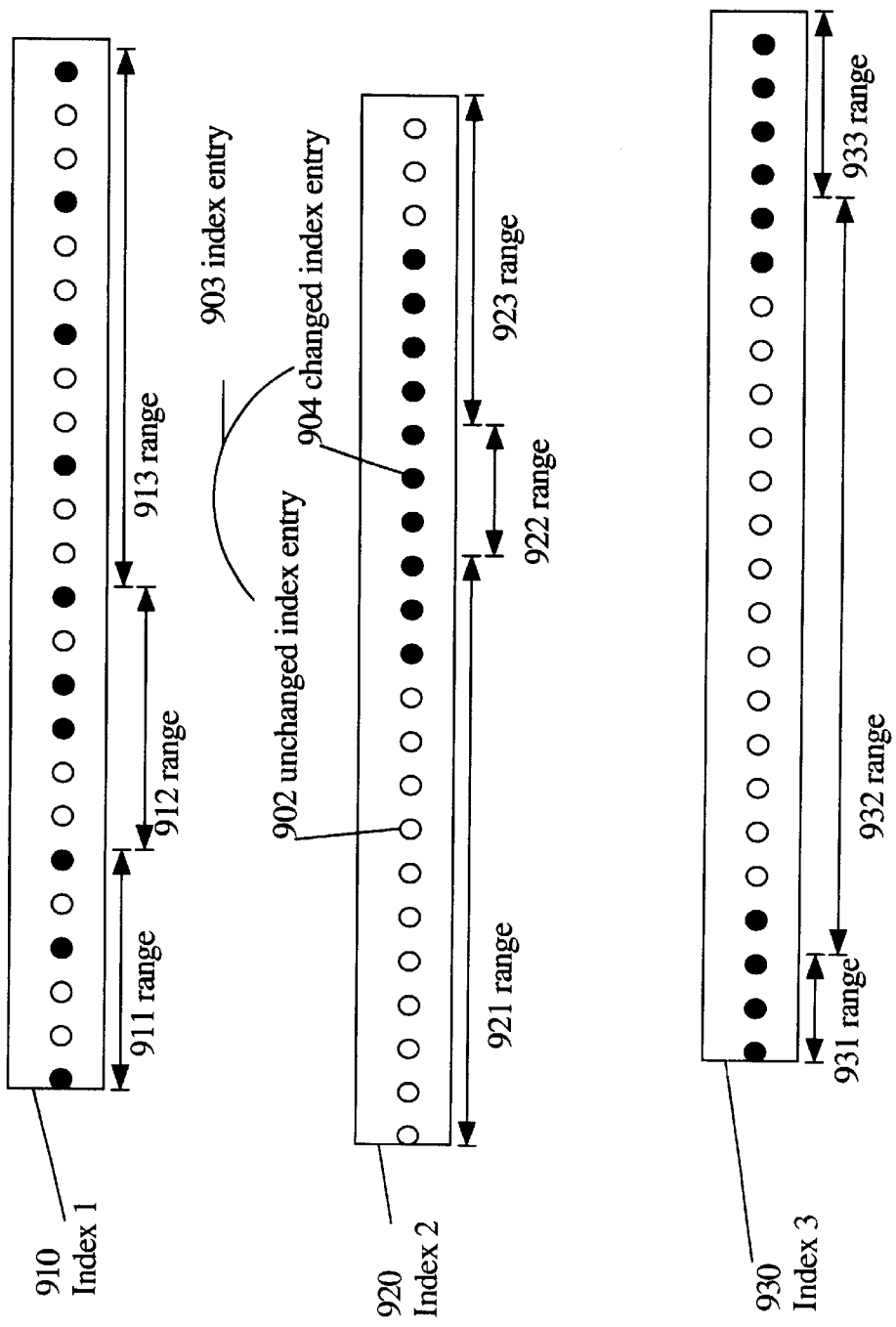
FIG. 9 is a schematic diagram indicating the index entries affected among three example global indexes for one example database, and ranges according to another embodiment of the present invention.

In this preferred embodiment, the CP maintains a private buffer for each global index and performs the steps illustrated in FIG. 8B. In step 812, the CP inserts the records received from each modified PDML slave into the appropriate buffer based on the global index of the index maintenance record. The CP inserts each record into each buffer to maintain an order by index key value. After all records from all PDML slaves have been inserted into the buffers, the ranges are then determined by stepping through the sorted buffer in step 822, where the current buffer has S* records. In step 832 the degree of parallelism for the update is determined by the number of nodes, N, to be used for the index update. For example, N is 4 in the system of FIG. 7. As in other embodiments, the number N of index update slaves can be different than the number of PDML slaves. In step 842, the end of the index key value range for one of the index update slaves is then obtained by taking the record at the position of the next multiple of S*/N in the current CP buffer for one of the global indexes. In step 852, control returns to step 842 until ranges are defined for all N index update slaves. In step 862, control returns to step 822, to select the next buffer, until buffers for all the global indexes have been used. The results of computing ranges for three global indexes are shown in FIG. 9. FIG. 9 also illustrates why sorting each global index separately is preferable.

FIG. 9 is a schematic diagram indicating the index entries affected among three example global indexes for one example database. In FIG. 9 each rectangle represents a separate global index with the horizontal position representing relative value of an index key. Three global indexes are depicted. Each circle inside a rectangle represents an entry in the index leaf blocks. Adjacent circles are likely to be in the same leaf block, and separated circles are likely in different leaf blocks. An open circle represents an index entry that is not changed by any of the index maintenance records, while a solid filled circle represent an index entry that is changed by at least one record of the index maintenance records.

In the example of FIG. 9, ten index entries are changed in each of the three global indexes, as might occur with 30 index maintenance records without any repeated triplet of Index ID and Key value and Data ID. The ten changed entries for the first index 910 are widely spaced. The first three changes are assigned to the first index update slave, the next three to the next slave, and the final four to the last slave. The resulting ranges 911, 912 and 913 for the three slaves are about equal. The ten changed entries for index 2, 920 are clustered together in the upper half of the range of index key values. The first range 921 which includes the first three changes, covers a wide interval of index key values. The second range, 922 including the next three changes, is very short, and the last range 923 is intermediate in extent. Finally, the ten changed entries for the third global index 930 are clustered in two sections, one at low values of the index key and another at the largest values of the index key. In this case, the first range 931, which encompasses the first three changes is short; the second range 932, which covers the wide gap between changed entries is large; and, the last range 933 is again narrow.

During step 540 (in FIG. 5) these ranges are assigned to the available slaves. One approach is to assign the first range of each index, i.e., 911, 921 and 931 to the first index update slave (741 in FIG. 7), the second range of each index, i.e., 912, 922 and 932 to the second index update slave (742 in FIG. 7), etc. Alternatively the ranges can be distributed differently. For example, to distribute the load associated with the third range in each index which has the extra change, the ranges can be cycled through the slaves, so that the first index update slave 741 gets the first range of the first index, the second range of the second index and the third range of the third index, 911, 922 and 933, respectively.

It is also possible, according to the invention, to modify the ranges in anticipation of the slave which will execute the update operations. For example, since the second index update slave 742 (in FIG. 7) has a greater affinity for the global index 170 (in FIG. 7) at its own node 112, its range can be increased for that global index. Assuming the global index 170 is the first global index 910, then the second range 912 for the second index update slave 742 can be increased, for example by including a fourth change in the range. Accounting for node affinity in defining the ranges is reflected in step 840 in FIG. 8A and step 842 in FIG. 8B.

One alternative allowed by the present invention is for assigning a separate index to each slave, e.g., to assign index 1, 910, to slave 1, 741, index 2, 920, to slave 2, 742, and index 3, 930, to slave 3, 743. This would be accomplished by adding the Index ID as the most significant digits to the Key value and sorting on the resulting number, using all S samples, as described above. That procedure will also appear to even the load if one index has no more changes than another index. However, uneven loads on the index update slaves can persist with this method. As shown in FIG. 9, the changes to index 2 are clustered while the changes to index 1 are not. This places a greater load on the slave updating index 1. To see this, assume that a leaf block is filled by three entries in each of the three indexes in FIG. 9. Then the slave updating the first index 910 will have to read and make changes in every leaf block in the index, a total of 16 disk operations (8 disk reads and 8 disk writes) in this example. On the other hand, the slave updating the second index 920 would have to read and write only four leaf blocks, 8 disk operations, because these changes are more clustered making better use of the node's cache. Therefore the load on the slave updating index 2, 920, is much less than the load on the slave updating index 1, 910. More even distribution of the load is achieved, therefore, if each slave updates a range in each index; and this is the preferred embodiment.

Figure 10:
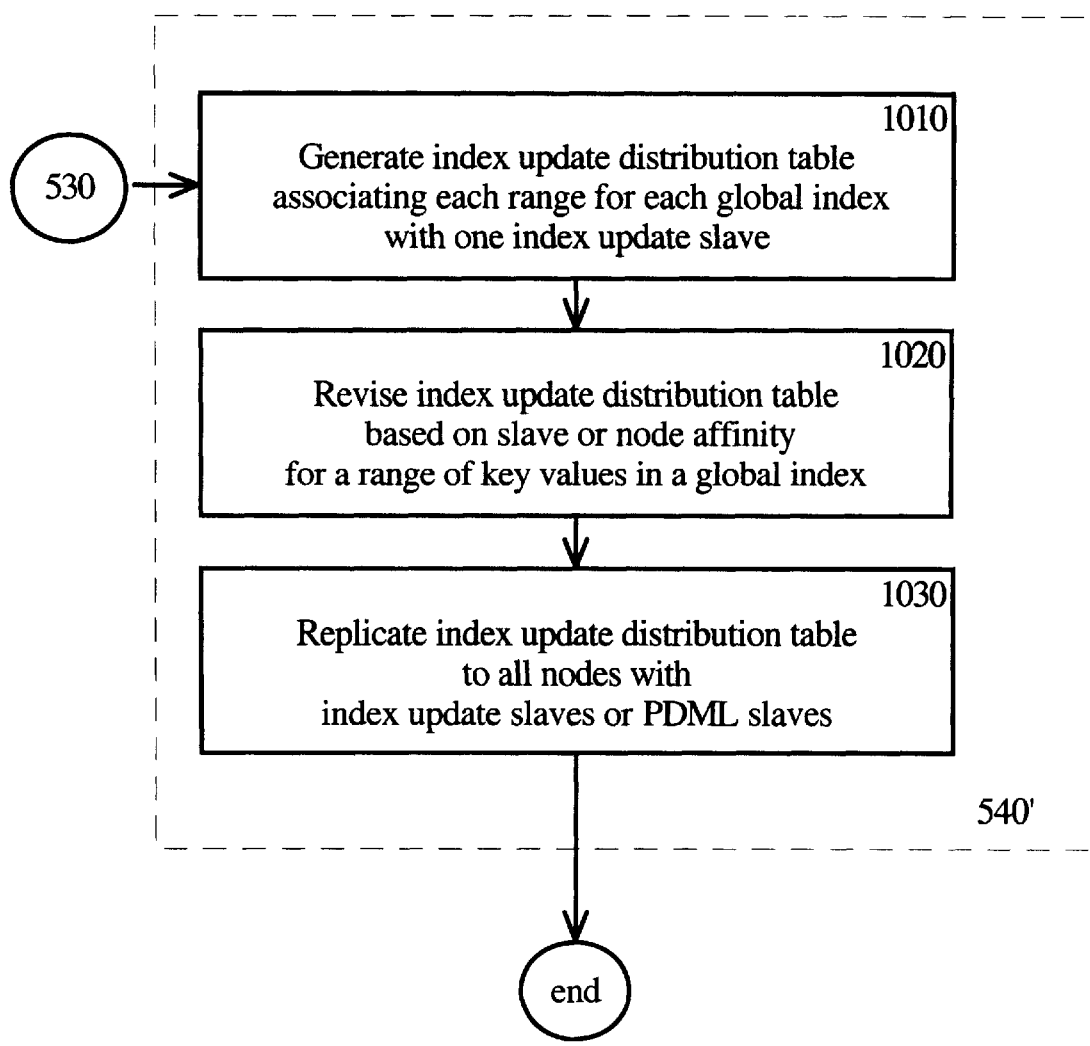

FIG. 10 is a flowchart detailing the step for distributing the ranges to the slaves (540 of FIG. 5) according to another embodiment of the present invention. In this embodiment, more than the ranges that apply to a particular slave are sent to each node. Here an index update distribution table listing all ranges for all slaves is generated 1010 and replicated 1030 on all nodes with slaves. This enables each PDML slave or index update slave to send index maintenance records generated on its node to the slave intended to apply the record to the index, according to the coordination provided by the modified CP. As for the individual ranges, the CP may adjust the ranges 1020 associated with each slave based on affinity of certain slaves for certain ranges of certain global indexes, if any, using distribution procedures known in the art. FIG. 7 shows the index update distribution table 723 established by the CP and its replications 721, 722 and 724 on nodes 111, 112 and 114, respectively.

FIG. 11 is a schematic diagram of an example index update distribution table for coordinating index updates according to another aspect of the present invention. The index update distribution table 1100 includes a plurality of rows or records. Each index update distribution record represents a different range for a different index update slave. Each row has several fields to identify the range and the slave. In the example index update distribution table 1100 in FIG. 11, five fields are shown, one for the Index ID described earlier, 1111, two for the range, 1112 and 1113, one for a node identification (Node ID), 1115, which uniquely identifies a node on the system, and one for a slave identification (Slave ID) which uniquely identifies the index update slave process among all the processes running on the node. Here the contents of the Slave ID and Node ID are represented by their item numbers from FIG. 7, for illustration purposes. Not all these fields are necessary in every implementation of the invention. For example, if only one global index is involved, the Index ID column 1111 can be omitted from the index update distribution table. As another example, a list of ranges can be represented by one column if the ranges are non-overlapping and contiguous, so either the Key start value column 1112 or the Key end value column 1113, but not both, can be omitted. Finally, other methods known in the art to uniquely identify a process for sending messages or other data to the process can be used in lieu of the Slave ID and Node ID shown in Table 1100.

FIG. 12A is a flowchart of a slave process according to one embodiment of the present invention. The slave that manipulates the table (by inserting, deleting and/or updating rows) also generates the corresponding index maintenance records and sends those records to the CP 1210. This sending step might be performed by the same slave that does update the index, i.e., the index update slave, e.g., slave 741 or this might be performed by a separate, modified PDML slave, e.g., 731. As described above, in the preferred embodiment, a modified PDML slave keeps all index maintenance records in buffers for each index during Phase I, and sorts and samples from the buffers in Phase II as part of the sending step 1210. The modified PDML or index update slave then receives the range or ranges for values of one or more index keys sent by the CP 1220. The index update slave then updates the index using the information in the next available index maintenance record according to procedures known in the art, but, only if the index key value in the record, e.g., the contents of column 612 in FIG. 6, is within the range received 1230 that is associated with that index update slave.

According to another embodiment of the present invention, an index update distribution table, e.g., 1100 in FIG. 11, is used to enable the slaves to receive the ranges, e.g., columns 1112 and 1113. All the modified PDML slaves or index update slaves may thus receive all ranges for all index update slaves identified, for example, in columns 1114 and/or 1115.

FIG. 12B is a flowchart detailing the step 1230 of FIG. 12A for an index update slave according to another embodiment of the present invention. In this embodiment, a data update distribution table has been received by a particular index update slave or modified PDML slave. For example, Table 1100 in FIG. 11 may be received by slave 741. The particular modified PDML slave or index update slave 741 uses the index maintenance records available on its node 111 that were generated there by the local PDML slave 731. The index update slaves use the index maintenance records sent there by other slaves. In this way, index maintenance records can come directly from other slaves and need not be sent by the CP.

The particular slave 741 processes each index maintenance record, whether generated at node 111 or received from slaves on other nodes. The index maintenance record that is currently being processed by the slave 741 is referred to herein as the "current index maintenance record", while the Key value and Index ID within that record are referred to herein as the "current Key value" and "current Index ID", respectively.

A current Key value is obtained from the current record, and if available, so is a current Index ID. For example, if the index maintenance record 625 in FIG. 6 is the current record, then the current Key value is "12" and the current Index ID is "1." The index update distribution table 1100 is then checked to locate a row containing a range that includes the current Key value and the current Index ID, if any (step 1250). For example, table 1100 in FIG. 11 is checked to locate row 1122 which has a range 12–20 which includes the current Key value "12" and an Index ID "1" the same as the current Index ID.

At step 1260, the Slave ID in the located row is compared against the ID of the particular index update slave. If they are the same, the particular slave updates the index 1270; if not, the index maintenance record is sent to the proper other slave 1280. For example, the Slave ID in the located row is "742" which is not the same as the particular index update slave "741." Therefore, in this example, the current index maintenance record 625 is sent to the slave with Slave ID "742" (i.e. slave 742 on node 112 in FIG. 7). If the Key value in the index maintenance record had been 11, e.g., record 626 in FIG. 6, then the located record would have been 1121 in the distribution table 1100, which indicates the particular slave 741. In this case the particular slave would update the global index according to the "insert" operation specified in the index maintenance record 626.

In the preferred embodiment, the modified PDML slaves receive and use the index update distribution table in Phase III. In this case, the index update slave ID in the located row will never be the same as the PDML slave. Thus the determination made in step 1260 can be skipped, and the "No" path always followed to step 1280. At step 1280, the current index maintenance record is sent to the proper other slave. For example, the Slave ID in the located row is "742." Therefore, in this example, the current index maintenance record 625 is sent by the modified PDML slave that generated the record, from its buffer to the index update slave with Slave ID "742" (i.e. slave 742 on node 112 in FIG. 7).

Processing then continues with the next index maintenance record available on the node until there are no records left (step 1290). In this way, the index maintenance records are distributed to the slaves in a coordinated manner according to instructions from the CP.

In the preferred embodiment, each index update slave stores all the index maintenance records it receives in a buffer in sorted order, by index key value. Then the index update slave can perform updates to the index that benefit from clustering.

DEFERRED INDEX UPDATES

The techniques described above enhance scaleable parallelism. In addition, they separate the data manipulation steps of a PDML operation from the global index update steps so that the latter can be performed at a separate time, arbitrarily delayed after the data manipulation operations. For example, the global index update can be done overnight or at other off peak periods known in the art. This provides useful flexibility and an added advantage for the present invention.

After the database tables have been modified by the PDML slaves and before the global indexes are updated by the index update slaves, the global index is out of date. Indexed access to the database will have to be modified accordingly. According to one embodiment, (1) a flag is used to indicate whether a global database is out of date, (2) a sorted version of the index maintenance records is stored with the global index, and (3) the index maintenance records are checked after using the global index to correct the results obtained from the global index. In the preferred embodiment, the sorted version of the index maintenance records is provided by the sorted buffers of each index update slave and the index update distribution table.

FIG. 13 is a flowchart illustrating steps for using a global index according to an embodiment of the invention. At step 1340, a query is performed using the global index. At step 1360, a flag is checked to determine if the global index is out of date. If the flag indicates the global index is not out of date, processing proceeds normally (step 1380).

If the global index is out of date, however, the query result is revised by searching through the set of sorted index maintenance records to find the unique records with indexed key values that have been changed (step 1370). The first result is adjusted according to the operations specified in the Opcode (614 in FIG. 6) of the index maintenance records that match the key values of the original query.

In the foregoing specification, the invention has been described with reference to specific embodiments thereof. It will, however, be evident that various modifications and changes may be made thereto without departing from the broader spirit and scope of the invention as defined by the appended claims and equivalents thereto. The specification and drawings are, accordingly, to be regarded in an illustrative rather than a restrictive sense.

What is claimed is:

1. A method for coordinating an update to a global index of an indexed table, the method comprising the steps of:
   receiving index maintenance records from a plurality of data manipulation slaves for the indexed table, wherein each index maintenance record includes a value for an index key of the global index;
   computing a plurality of ranges for values of the index key received in the index maintenance records;
   assigning each range of the plurality of ranges to a respective index update slave of a plurality of index update slaves; and
   distributing work associated with said update to said plurality of index update slaves based on the plurality of ranges assigned to said plurality of index update slaves.

2. The method of claim 1, wherein:
   the index maintenance records cover a plurality of global indexes associated with said indexed table;
   each index maintenance record includes an index identification that identifies a particular index of said plurality of global indexes; and
   the step of computing the plurality of ranges is performed for each index of said plurality of global indexes.

3. The method of claim 1, wherein the step of computing the plurality of ranges further comprises:
   sampling a set of the index maintenance records, wherein a number of records sampled is a sample size; and
   determining said plurality of ranges based upon index key values contained in said set of the index maintenance records.

4. The method of claim 3, wherein the step of determining said plurality of ranges includes:
   determining a number of index update slaves, wherein the number of index update slaves is an index update degree of parallelism;
   sorting values of the index key in the set of the index maintenance records sampled; and
   defining a range using an index key value at a specified position of the values of the index key after sorting, wherein the specified position is related to a multiple of the sample size divided by the index update degree of parallelism.

5. The method of claim 4, wherein, during the sampling, the sample size equals a total number of records received from said plurality of data manipulation slaves.

6. The method of claim 4, wherein, during the sampling, the sample size is a specified quantity less than a total number of records received from said plurality of data manipulation slaves.

7. The method of claim 4, wherein the specified position is also related to an affinity of the respective index update slave for leaf blocks in the global index, the leaf blocks containing the values of the index key in the range.

8. The method of claim 1, the distributing further comprising:
   generating an index distribution table including a range and a slave identification for each range of the plurality of ranges; and
   replicating the index distribution table for each index update slave of the plurality of index update slaves.

9. The method of claim 8, wherein the index distribution table includes an index identification associated with each range, wherein the index identification identifies which global index, of a plurality of global indexes built on said table, is associated with said range.

10. The method of claim 8, further comprising, before the replicating, revising the index update distribution table based on an affinity of a respective index update slave for leaf blocks in the global index, the leaf blocks containing values of the index key in the range.

11. The method of claim 1, further comprising, before receiving index maintenance records, distributing data manipulation operations among the plurality of data manipulation slaves.

12. The method of claim 11, wherein the data manipulation operations are distributed based on partitions formed using a key other than the index key of said global index.

13. The method of claim 11, wherein:
   the step of distributing data manipulation operations is performed by distributing data manipulation operations to a first number of data manipulation slaves;
   the step of distributing work associated with said update to said plurality of index update slaves is performed by distributing work to a second number of index update slaves; and
   the first number does not equal the second number.

14. A method for updating a global index of an indexed table comprising:
   receiving data that identifies a value range, where the value range defines a range of values for an index key of the global index of the indexed table;
   reading an index key value from a current index maintenance record; and
   updating the global index using the current index maintenance record if the index key value falls within the value range.

15. The method of claim 14, wherein said indexed table has a plurality of global indexes, the method further including:
   receiving an index identification associated with the value range;
   reading a current index identification from the current index maintenance record; and
   based on the current index identification, identifying which global index of the plurality of global indexes to update using said current index maintenance record.

16. The method of claim 14 wherein:
   a plurality of index update slaves is used to update said global index;
   each index update slave of said plurality of index update slaves has a slave identification;

the steps of receiving data that identifies the value range, reading the index key value, and updating the global index, are performed by a particular index update slave of said plurality of index update slaves;

the particular index update slave has a particular slave identification;

the step of receiving data that identifies the value range includes receiving an index update distribution table from a coordinator process, wherein the index update distribution table maps value ranges for the index key of the global index to slave identifications;

the method further includes the particular index update slave performing the steps of:
  locating the range in the index update distribution table that encompasses the index key value read from the current index maintenance record;
  determining if a slave identification associated with the range located corresponds to the particular slave identification; and
  if the slave identification corresponds to the particular slave identification, then updating the global index using the current index maintenance record.

17. The method of claim 16, further comprising, if the slave identification does not correspond to the particular slave identification, then sending the current index maintenance record to a slave corresponding to the slave identification.

18. The method of claim 16, wherein:
the indexed table has a plurality of global indexes;
the index update distribution table includes an index identification associated with each range;
the method further comprises reading a current index identification from the current index maintenance record; and
during said updating the global index, the particular index update slave determines which global index of the plurality of global indexes to update based on the current index identification.

19. A method of parallelizing a data manipulation operation on an indexed table, the method comprising the steps of:
based on a first partitioning criteria, dividing said data manipulation operation into a first set of work granules;
distributing said first set of work granules to a first set of slaves;
based on a second partitioning criteria, dividing a task of changing one or more indexes built on said indexed table into a second set of work granules; and
distributing said second set of work granules to a second set of slaves;
wherein said task of changing said one or more indexes includes updating said one or more indexes to reflect changes made to said indexed table by said data manipulation operation; and
wherein said first partitioning criteria is different than said second partitioning criteria.

20. The method of claim 19 wherein the task of changing one or more indexes is divided based on index key value ranges.

21. The method of claim 19 wherein the first set of slaves is not identical to said second set of slaves.

22. The method of claim 21 wherein the first set of slaves includes a different number of slaves than said second set of slaves.

23. The method of claim 21 wherein the first set of slaves includes a slave running on a node that does not execute any slaves of said second set of slaves.

24. The method of claim 21 wherein the second set of slaves includes a slave running on a node that does not execute any slaves of said first set of slaves.

25. The method of claim 20 further comprising the step of establishing the index key value ranges based on a sampling of index maintenance records generated by said first set of slaves.

26. A computer-readable medium bearing instructions arranged to cause one or more processors to perform:
receiving index maintenance records from a plurality of data manipulation slaves for an indexed table of a database, wherein each index maintenance record includes a value for an index key of a global index for the indexed table;
computing a plurality of ranges for values of the index key received in the index maintenance records;
assigning each range of the plurality of ranges to a respective index update slave of a plurality of index update slaves; and
distributing work associated with an update of said global index to said plurality of index update slaves based on the plurality of ranges assigned to said plurality of index update slaves.

27. A computer-readable medium bearing instructions arranged to cause one or more processors to perform:
receiving data that identifies a value range, where the value range defines a range of values for an index key of a global index of an indexed table;
reading an index key value from a current index maintenance record; and
updating the global index using the current index maintenance record if the index key value falls within the value range.

28. A computer-readable medium bearing instructions arranged to cause one or more processors to perform:
based on a first partitioning criteria, dividing a data manipulation operation into a first set of work granules;
distributing said first set of work granules to a first set of slaves;
based on a second partitioning criteria, dividing a task of changing one or more indexes built on an indexed table into a second set of work granules; and
distributing said second set of work granules to a second set of slaves;
wherein said task of changing said one or more indexes includes updating said one or more indexes to reflect changes made to said indexed table by said data manipulation operation; and
wherein said first partitioning criteria is different than said second partitioning criteria.

29. A computer-readable medium bearing information for use by one or more processors that are participating in execution of a global index update, the information comprising:
an index maintenance record;
the index maintenance record including
  an index identification that identifies a global index requiring change; and
  an index key value of the global index, the index key value indicating an index entry requiring change within the global index.

30. A computer-readable medium bearing information for use by one or more processors that are participating in execution of a global index update, the information comprising:

an index update distribution record;

wherein the index update distribution record includes
data that identifies a range of values, wherein the range of values is for an index key of a global index of an indexed table; and a slave identification, wherein said slave identification identifies a slave responsible for performing updates to said global index for index entries associated with key values that fall within said range of values.

31. The computer-readable medium of claim 30, the index update distribution record further comprising an index identification for indicating one global index of a plurality of global indexes.

32. A system for maintaining a global index of a database in response to parallel data manipulation operations, the system comprising:

a plurality of processing nodes;

a network connecting the plurality of nodes;

an indexed table having a global index based on an index key residing on at least one of the plurality of nodes;

a coordinator process running on a first node of the plurality of nodes;

a plurality of data manipulation slaves, each data manipulation slave on a respective node of the plurality of nodes; and a plurality of index update slaves, each index update slave on a respective node of the plurality of nodes;

wherein, the coordinator process is configured to distribute data manipulation operations among the plurality of data manipulation slaves, to receive index maintenance records from the plurality of data manipulation slaves, each record including an index key value, to compute a plurality of ranges for values of the index key received in the index maintenance records, and to send each range of the plurality of ranges to a respective index update slave;

wherein each data manipulation slave is configured to perform a data manipulation operation on a row of the database and to send an index maintenance record to the coordinator process; and wherein each index update slave is configured to receive a respective range of the plurality of ranges, to read an index key value from a current index maintenance record, and to update the global index using the current index maintenance record if the index key value falls within the range of values.

33. A method of using a global index of an indexed table comprising:

executing a query using an index key for the global index to provide a query result;

determining whether an out-of-date flag indicates the global index is not current;

if the out-of-date flag indicates the global index is not current, then searching through a set of sorted index maintenance records, each record containing a value of an index key for the global index and an index operation; and modifying the query result according to an index maintenance record that includes an index key value that matches the index key value used in the query.

34. A computer-readable medium bearing instructions arranged to cause one or more processors to perform:

executing a query using an index key for a global index of an indexed table to provide a query result;

determining whether an out-of-date flag indicates the global index is not current;

if the out-of-date flag indicates the global index is not current, then searching through a set of sorted index maintenance records, each record containing a value of an index key for the global index and an index operation; and modifying the query result according to an index maintenance record that includes an index key value that matches the index key values used in the query.

35. A computer-readable medium bearing instructions arranged to cause one or more processors to perform:

distributing data manipulation operations among a plurality of data manipulation slaves, receiving index maintenance records from the plurality of data manipulation slaves, each record including an index key value for a global index of an indexed table, computing a plurality of ranges for values of the index key received in the index maintenance records, and sending each range of the plurality of ranges to a respective index update slave among a plurality of index update slaves, by a coordinator process;

performing a data manipulation operation on a row of the database and sending an index maintenance record to the coordinator process, by a data manipulation slave; and receiving a respective range of the plurality of ranges, reading an index key value from a current index maintenance record, and updating the global index using the current index maintenance record if the index key value falls within the range of values, by an index update slave.

36. The method of claim 1, the distribution further comprising:

generating an index distribution table including a range and a slave identification for each range of the plurality of ranges; and replicating the index distribution table for each data manipulation slave of the plurality of data manipulation slaves.

37. The method of claim 1, wherein:

the step of receiving index maintenance records further comprises inserting maintenance records into a buffer for the global index so the records are in order of increasing key value in the buffer; and the step of computing the plurality of ranges further comprises determining said plurality of ranges based upon index key values contained in said buffer.

38. The method of claim 37, wherein the step of determining said plurality of ranges includes:

determining a number of index update slaves, wherein the number of index update slaves is an index update degree of parallelism;

determining a sample size equal to a number of index maintenance records in the buffer; and defining a range using an index key value in a index maintenance record at a specified position of the buffer, wherein the specified position is related to a multiple of the sample size divided by the index update degree of parallelism.

39. The method of claim 14, wherein:

a plurality of index update slaves is used to update said global index;

each index update slave of said plurality of index update slaves has a slave identification;

the step of receiving data that identifies the value range includes receiving an index update distribution table from a coordinator process, wherein the index update distribution table maps value ranges for the index key of the global index to slave identifications; and the method further comprises locating the range in the index update distribution table that encompasses the index key value read from the current index maintenance record, determining an slave identification associated with the range located, and sending the current index maintenance record to an index update slave corresponding to the slave identification associated with the range.

40. The computer-readable medium of claim 26 bearing instructions arranged to cause one or more processors to further perform:

generating an index distribution table including a range and a slave identification for each range of the plurality of ranges; and replicating the index distribution table for each data manipulation slave of the plurality of data manipulation slaves.

41. The computer-readable medium of claim 26, wherein:

the step of receiving index maintenance records further comprises inserting maintenance records into a buffer for the global index so the records are in order of increasing key value in the buffer; and the step of computing the plurality of ranges further comprises determining said plurality of ranges based upon index key values contained in said buffer.

42. The computer-readable medium of claim 41, wherein the step of determining said plurality of ranges includes:

determining a number of index update slaves, wherein the number of index update slaves is an index update degree of parallelism;

determining a sample size equal to a number of index maintenance records in the buffer; and defining a range using an index key value in a index maintenance record at a specified position of the buffer, wherein the specified position is related to a multiple of the sample size divided by the index update degree of parallelism.

43. The computer-readable medium of claim 27, wherein:

a plurality of index update slaves is used to update said global index;

each index update slave of said plurality of index update slaves has a slave identification;

the step of receiving data that identifies the value range includes receiving an index update distribution table from a coordinator process, wherein the index update distribution table maps value ranges for the index key of the global index to slave identifications; and the instructions are arranged to cause one or more processors to further perform locating the range in the index update distribution table that encompasses the index key value read from the current index maintenance record, determining an slave identification associated with the range located, and sending the current index maintenance record to an index update slave corresponding to the slave identification associated with the range.

\* \* \* \* \*